(12) United States Patent
Kramer et al.

(10) Patent No.: US 7,818,153 B2
(45) Date of Patent: Oct. 19, 2010

(54) SYSTEM AND METHOD FOR CONSTRAINING A GRAPHICAL HAND FROM PENETRATING SIMULATED GRAPHICAL OBJECTS

(75) Inventors: James F. Kramer, Palo Alto, CA (US); Christopher Ullrich, San Francisco, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 12/346,686

(22) Filed: Dec. 30, 2008

(65) Prior Publication Data
US 2009/0144664 A1    Jun. 4, 2009

Related U.S. Application Data

(63) Continuation of application No. 10/801,643, filed on Mar. 17, 2004, now Pat. No. 7,472,047, which is a continuation of application No. 09/432,362, filed on Nov. 3, 1999, now abandoned, and a continuation-in-part of application No. 09/076,617, filed on May 12, 1998, now Pat. No. 6,042,555.

(60) Provisional application No. 60/106,904, filed on Nov. 3, 1998, provisional application No. 60/046,185, filed on Apr. 12, 1997.

(51) Int. Cl.
*G06G 7/48* (2006.01)
*G06F 3/01* (2006.01)
*G06F 3/048* (2006.01)

(52) U.S. Cl. ............................ 703/6; 715/701; 715/702; 715/757

(58) Field of Classification Search ..................... 703/6; 715/701, 702, 706, 757
See application file for complete search history.

(56) References Cited

U.S. PATENT DOCUMENTS 5,184,319 A    2/1993    Kramer (Continued)

OTHER PUBLICATIONS

Hitoshi Maekawa, John M. Hollerbach, "Haptic Display for Object Grasping and Manipulating in Virtual Environment" Proceedings of the 1998 IEEE International Conference on Robotics & Automation, Leuven, Belgium, May 1998, pp. 2566-2573.*

(Continued)

*Primary Examiner*—Dwin M Craig
(74) *Attorney, Agent, or Firm*—Kilpatrick Stockton LLP

(57) ABSTRACT

Movement of a graphical hand is constrained when the physical hand controlling the graphical hand does not have a similar physical constraint. An analysis of a revolute-joint-link-spring model in which an uncompressed/unextended spring position represents the corresponding measured joint angle or link position is used. Linear springs, non-linear springs, or the like may be employed to obtain the desired result of allowing a graphical joint or link to deviate from what the corresponding measured joint or link provides. If a graphical hand configuration causes a portion of the hand to penetrate a simulated graphical solid object, a mathematical determination is used to compute modified joint and link positions such that the graphical hand part will no longer penetrate the solid object. Such a constraint technique may include solving a spring model such that the various joint and link springs compress or extend to produce modified joint and link positions.

17 Claims, 17 Drawing Sheets

U.S. PATENT DOCUMENTS

| | | | |
|---|---|---|---|
| 5,280,265 A | | 1/1994 | Kramer et al. |
| 5,482,056 A | * | 1/1996 | Kramer .................. 600/595 |
| 5,548,694 A | * | 8/1996 | Frisken Gibson .......... 345/424 |
| 5,625,576 A | * | 4/1997 | Massie et al. ............. 703/6 |
| 5,676,157 A | | 10/1997 | Kramer |
| 6,084,587 A | * | 7/2000 | Tarr et al. ............. 345/419 |

OTHER PUBLICATIONS

Coiffet, P. et al., The LRP Dextrous Hand Master, VR Systems Fall 1993 Conference, Sig Advanced Applications, New York City, Oct. 1993.

Gomez, D. et al., Integration of the Rutgers Master II in a Virtual Reality Simulation, 1995 IEEE Virtual Reality Annual International Symposium, pp. 198-202, San Francisco, CA, 1995.

Luecke, G. et al., An Exoskeleton Manipulator for Application of Electro-Magnetic Virtual Forces, Proceedings of the 1996 ASME Dynamics Systems and Control Division, pp. 489-494, Atlanta, Ga, Nov. 17-22, 1996.

Noma, H. et al., Cooperative Object Manipulation in Virtual Space Using Virtual Physics, Proceedings of the 1997 ASME Dynamic Systems and Control Division, pp. 101-106, Dallas, TX, Nov. 16-21, 1997.

Rosenberg, L., A Force Feedback Programming Primer-For PC Gaming Peripherals Supporting I-Force 2.0 and Direct X 5.0, San Jose, CA, 1997.

SensAble Technologies, GHOST Software Developers Toolkit- Programmers Guide Version 1.1, Cambridge, MA 1996.

Thompson II, T. et al., Maneuverable Nurbs Models within a Haptic Virtual Environment, Proceedings of the 1997 ASME Dynamics Systems and Control Division, pp. 37-44, Dallas, TX, Nov. 16-21, 1997.

* cited by examiner

SYSTEM AND METHOD FOR CONSTRAINING A GRAPHICAL HAND FROM PENETRATING SIMULATED GRAPHICAL OBJECTS

CROSS-REFERENCE TO RELATED APPLICATIONS

The present application is a continuation of U.S. patent application Ser. No. 10/801,643, now U.S. Pat. No. 7,472,047, filed Mar. 17, 2004 which is a continuation of U.S. patent application Ser. No. 09/432,362, filed Nov. 3, 1999, now abandoned, which claims the benefit of priority to U.S. Provisional Application Ser. No. 60/106,904, filed Nov. 3, 1998, and which is a continuation-in-part of U.S. patent application Ser. No. 09/076,617, filed May 12, 1998, now U.S. Pat. No. 6,042,555, which claims the benefit of priority to U.S. Provisional Application Ser. No. 60/046,185, filed May 12, 1997, the entireties of which are hereby incorporated by reference.

FIELD OF THE INVENTION

This invention relates generally to systems, apparatuses, and methods for simulation and training using interactive computer graphics.

BACKGROUND OF THE INVENTION

1. Description of the Relevant Art

In the past few years, computers have seen a significant increase in 3D graphical capabilities. Not surprisingly, interfaces capable of interacting with these complex 3D environments have started to move from laboratories to the enterprise and the consumer market as companies have begun to produce them in volume. While interfacing hardware has made significant advances, the accompanying software has lagged behind. This is not surprising considering the complexity involved in physically modeling computer-generated environments. Nonetheless, companies producing some of the less-complex interface hardware have introduced Application Program Interfaces (APIs) and Software Development Kits (SDKs) that facilitate the task of integrating their products into third-party applications.

Some of the hardware interfaces include force-feedback joysticks and steering wheels. Two companies which have introduced API's and SDK's for their joystick/steering wheel peripherals include Immersion Corporation and Cybernet Systems. Immersion markets its I-FORCE™ API, a programming interface that lets developers simulate various force-feedback effects such as: impacts, recoils, vibrations, springs, etc. It has been integrated into Microsoft's DirectX specification [4]. Similarly, Cybernet has introduced its CyberImpact™ SDK, with comparable features to Immersion's I-FORCE.

Another company that produces a haptic SDK is SensAble Technologies. SensAble markets a 3-degree-of-freedom (3DOF) force-feedback stylus called the PHANToM™ and their accompanying SDK is named GhoSt™ [5]. Ghost is an object-oriented toolkit that represents the haptic environment as a hierarchical collection of geometric objects (spheres, cubes, cylinders, etc.) and spatial effects (springs, dampers, vibrations, etc.) The Ghost toolkit includes a spring model for presenting a single graphical point, as controlled by the PHANToM, from penetrating a graphical object. Noma and Miyasato propose a technique similar to Ghost, but also limit their technique to a single, non-articulated point [7].

Predictably, the first SDK's and API's to appear have been associated with relatively simple devices such as joysticks, steering wheels and 3D styli. In these cases, either the degrees of freedom of the device are limited, or a single point is interacting with the environment. Not surprisingly, comparable software for whole-hand input interfaces has lagged behind because of the inherent complexity of the whole-hand interaction paradigm, with its multiple constraints and multiple, articulated degrees of freedom. Although whole-hand input devices present a greater challenge to integrate, they provide an extremely appealing advantage for interaction. What better way to manipulate complex virtual objects than to just "reach in and grab them?"

When trying to manipulate 3D objects, interfaces such as 2DOF mice, joysticks and styli quickly display their inherent limitations. However, users wearing instrumented gloves, or using some alternative hand-measurement system, if properly implemented, can manipulate digital objects just as they would in the real world. Up until a few years ago, these whole-hand software development efforts have resided in university and government laboratories. Examples include the work of Burdea et al. at Rutgers University using the Rutgers Master II [2], and the work of Coiffet et al., at the Laboratoire de Robotique de Paris, using the LRP Hand Master [1]. More recently, Luecke et al. have developed software to use an exoskeleton haptic device to apply virtual forces [3] and Thompson et al. [6] have used the Sarcos Dextrous Arm Master to perform direct parametric tracing on maneuverable NURBS models.

Commercially, two companies have introduced whole-hand software libraries. Virtual Technologies, Inc. has offered its VirtualHand® Software Library, while 5DT has offered an API for its DataGlove. Both let the user display a graphical hand on the screen that mimics the glove wearer's movement, but they do not provide manipulation capabilities; such capabilities are presently left to the user to develop. Inventive features of the subject invention include enhanced manipulation capabilities, the ability to prevent the virtual hand from penetrating grasped objects and virtual walls, and enabling dynamic interaction between the virtual hand and various controls.

2. References

1. P. Coiffet, M. Bouzit and G. Burdea, "The LRP Dextrous Hand Master," VR Systems Fall 1993 Conference, Sig Advanced Applications, New York City, October, 1993.
2. D. H. Gomez, G. Burdea and N. Langrana, "Integration of the Rutgers Master II in a Virtual Reality Simulation," 1995 IEEE Virtual Reality Annual International Symposium, pp. 198-202, San Francisco, Calif., 1995.
3. G. R. Luecke, Y. H. Chai, J. A. Winkler and J. C. Edwards, "An Exoskeleton Manipulator for Application of Electro-Magnetic Virtual forces," Proceedings of the 1996 ASME Dynamics Systems and Control Division, pp. 489-494, Atlanta, Ga., Nov. 17-22, 1996.
4. L. Rosenberg, "A Force Feedback Programming Primer—For PC Gaming Peripherals Supporting I-Force 2.0 and Direct X 5.0," San Jose, Calif., 1997.
5. SensAble Technologies, "GHOST Software Developer's Toolkit—Programmer's Guide Version1.1," Cambridge, Mass. 1996.
6. T. V. Thompson II, D. D. Nelson, E. Cohen and J. Hollerbach, "Maneuverable Nurbs Models within a Haptic Virtual Environment," Proceedings of the 1997 ASME Dynamics Systems and Control Division, pp. 37-44, Dallas, Tex., Nov. 16-21, 1997.
7. H. Noma and T. Miyasato, "Cooperative Object Manipulation in Virtual Space Using Virtual Physics," Proceedings of the 1997 ASME Dynamic Systems and Control Division, pp. 101-106, Dallas, Tex., Nov. 16-21, 1997.

The following cited patents provide additional description that may assist in understanding the invention. Each of these patents is hereby incorporated by reference in its entirety.
1. J. Kramer et al., "Strain-sensing goniometers, systems and recognition algorithms," U.S. Pat. No. 5,280,265, Jan. 18, 1994.
2. J. Kramer, "Force feedback and texture simulating interface device," U.S. Pat. No. 5,184,319, Feb. 2, 1993.
3. J. Kramer, "Determination of Thumb Position Using Measurements of Abduction and Rotation," U.S. Pat. No. 5,482,056, Jan. 9, 1996.
4. J. Kramer, "Determination of kinematically Constrained Multi-Articulated Structures," U.S. Pat. No. 5,676,157, Oct. 14, 1997.

SUMMARY OF THE INVENTION

The subject invention includes a structure and method for determining the configuration of a graphical hand and arm based on the measurement of a controlling physical hand and arm, specifically where the graphical hand and arm are constrained in movement upon coming into contact with an immoveable graphical object or other simulated graphical impediment, but where the physical hand and arm are not similarly restrained in their movement.

In one aspect, the invention provides a system for moving a simulated multi-articulated structure in relation to the movement of an analogous physical multi-articulated structure, where the simulated structure moves in a simulated environment having a simulated impediment to free motion, where the physical structure moves in an environment lacking an analogous physical impediment, and where in one embodiment the system includes a device for measuring the configuration of the physical structure and the spatial placement of the physical structure relative to an inertial reference frame and providing digitized signals associated with the configuration and spatial placement; and a data processor, including data related to the spatial placement of the simulated impediment, for receiving the digitized signals and modifying the signals to generate a set of modified signals specifying the configuration and spatial placement of the simulated structure, whereby the free motion of the simulated structure is impeded when encountering the simulated impediment.

In another aspect, the invention provides a method for moving a simulated multi-articulated structure in a graphical environment, having an impediment to free motion, in relation to the movement of an analogous physical multi-articulated structure in a physical environment lacking the impediment, where in one embodiment the inventive method includes the steps of generating digitized signals representing the configuration and spatial placement of the physical structure and transferring the digitized signals to a data processor; and in the data processor, recording the spatial placement of the impediment, generating modified signals from the digitized signals specifying the configuration and spatial placement of the graphical structure, and impeding the free motion of the simulated structure when the simulated structure encounters the impediment.

Device, computer program, and computer program product implementing embodiments of the inventive system and method are also provided.

DETAILED DESCRIPTION OF EMBODIMENTS OF THE INVENTION

Overview of Aspects of the Invention

Figure 1:
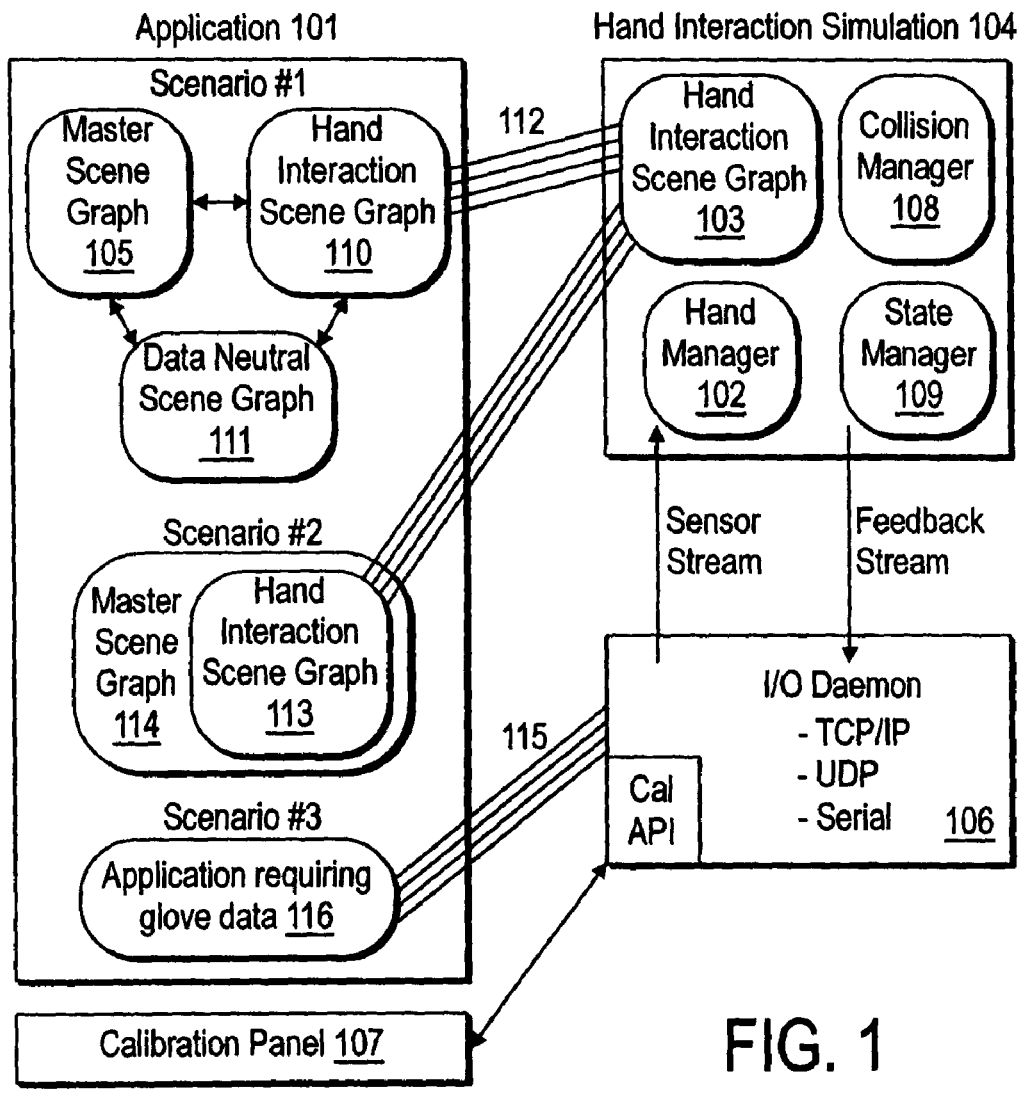
FIG. 1 shows a overview of an embodiment of the Virtual-Hand toolkit.

Graphical object manipulation in a computer-simulated environment holds much promise for increasing the productivity of users in a variety of occupations. Many of today's computer interfaces, such as mice and joysticks, are ill-suited for such a task and a better interaction paradigm is required. One such approach is the use of a graphical hand which mimics the movement of the user's hand as measure via an instrumented glove or other measurement device. While the concept of whole-hand interaction is intuitive and natural, its implementation is complex.

The field of virtual reality typically uses an instrumented glove or other hand-measurement apparatus to measure the movements of a user's physical hand and produce a graphical rendition of the hand (i.e., graphical hand) on a computer screen. Commonly, the goal of rendering the graphical hand is to allow contact and interaction between the graphical hand and a graphical object to be controlled or manipulated. The most common drawback to such a graphical simulation occurs when the physical hand does not possess any force feedback, or lacks adequate force feedback, to stop the physical hand and fingers from moving once the graphical hand has contacted a graphical impediment, such as an immovable graphical object. In such cases, the graphical hand associated with the physical hand will also continue to move, and thus penetrate the graphical object, greatly reducing the desired perception of the simulation that one is using their hand to interact with a real, solid object. There are two possible resolutions. One is to provide sufficient force feedback to stop the physical hand very precisely once the graphical hand impinges on the immoveable graphical object, such that the graphical hand may continue to correspond to the movements of the physical hand. That is, since the physical hand can be stopped by the force feedback device, likewise, the graphical hand would not be commanded to penetrate the object. An alternative solution, which finds use whenever there is non-existing, or insufficient, force feedback to the physical hand, is where the graphical hand ceases to exactly follow the physical hand. For example, a separate computer calculation might change the configuration, orientation or spatial placement, of the graphical hand such that it doesn't follow the measured physical hand, and such that the graphical hand obeys laws of physics during interaction with graphical objects. In particular, a graphical finger might bend backward such that it doesn't penetrate a graphical wall.

In typical previous attempts at simulating manual interaction with virtual objects, the simulation user or trainee wears an instrumented glove, i.e., a glove with sensors in it which measure the subtle movements of the fingers and hand. The industry standard instrumented glove on the market today is known as the CyberGlove®, manufactured by Virtual Technologies, Inc., the Assignees of this patent application. Hand-movement data is transmitted from the instrumented glove to the computer, which in turn draws a graphical image of the hand, i.e., a virtual hand, which replicates the movements of the physical hand. This virtual hand can then be made to interact with graphical objects, such as simulated controls. Based on the results of the interactions, the trainee learns how to operate the necessary controls, and also learns the effect the controls have on the high-level simulation. The problem with such simulations thus far has been the lack of intelligent software that realistically models the interactions between the virtual hand and an object to be manipulated. For instance, an all-to-typical scenario is that the virtual hand passes through the simulated control-panel surface as well as the controls that the virtual hand is intended to interact with. This unfortunately reduces the effectiveness of the simulation, since the trainee must change their manner of interaction to tailor to the limitations of the simulation. Thus "bad habits" might be learned which enable the trainee to efficiently operate the simulation, but due to their disparity from reality, do not lead to skills which transfer to the ultimate real task.

For example, in the physical world, when one turns on a household light via a standard wall-mounted toggle switch, one might extend their hand until it stops at the switch strike plate, and then slide their hand along the plate until contact is made with the switch. The sliding motion then continues until the switch has been toggled. In contrast, in present "virtual worlds," the trainee extends their physical hand, causing the virtual hand to also extend. However, when the virtual hand contacts the virtual strike plate, it passes right through! Thus, the trainee must visually concentrate to prevent their virtual hand from penetrating the strike plate, and must focus intently on visually contacting the toggle lever with their virtual hand. In other words, since the virtual hand's movement is not constrained by the wall surface, the trainee must concentrate unrealistically hard to locate the toggle switch in the "depth dimension," which is the dimension most difficult to judge visually.

The innovation of this inventive structure and method includes a hand-centric simulation method that adds physical constraints to virtual hand/object interaction and manipulation, and determines whether the virtual hand should not be allowed to pass through the graphical object, such as a control panel, or whether the virtual hand instead is capable of modifying the position or shape of the object, e.g., toggling a virtual switch control.

The subject invention provides an apparatus and method for constraining the movement of a graphical hand when the physical hand controlling the graphical hand does not have a similar physical constraint. The constraining technique may comprise use and analysis of a revolute-joint-link-spring model. In such a model, an uncompressed/unextended spring position represents the corresponding measured joint angle or link position. In addition to linear springs which follow Hook's Law, i.e., $F=k*x$, the springs may follow any desirable non-linear function to obtain the desired result of allowing a graphical joint or link to deviate from what the corresponding measured joint or link provides. If a graphical hand configuration corresponding to the measured joint and link positions would cause a portion of the hand to penetrate a simulated graphical solid object, a mathematical determination is used to solve the spring model such that the various joint and link springs compress or extend to allow the graphical joints and links to change their measured positions such that the graphical hand part will no longer penetrate the graphical solid object. Such a constraint technique may also be applied to constrain other graphical body parts and graphical inanimate objects, where corresponding physical controlling, i.e., measured, body parts and inanimate objects do not possess a similar constraint or impediment.

One embodiment of the subject invention comprises a host computer or data processor comprising a CPU (or other processor or micro-processor) and memory (such as RAM) coupled to the CPU. The memory stores data and procedures, including the inventive procedures, and cooperates with the CPU during execution. The procedures may be implemented with software executing on the host computer or data processor. The data processor may have one or more graphical objects or impediments loaded into its memory, its database, its scene graph, and/or the like. The data processor may have data related to the spatial placement of such graphical objects or impediments loaded into its memory, database, scene graph, and the like. Typically the data is stored, at least temporarily, in a data structure defined in the memory of the computer. The data processor may receive digitized signals (or other data) relating to the spatial placement and/or configuration of a controlling hand, body-part or compliant or articulated inanimate object. In the case where a hand is being measured, a CyberGlove instrumented glove may be used, or some other appropriate measurement device. The data processor may execute an algorithm residing in its memory for modifying the received digitized signals to generate a set of modified signals specifying a modified configuration and/or spatial placement of a corresponding simulated hand, body part or inanimate object, whereby the free motion of the simulated hand, body part or inanimate object is impeded or otherwise restricted when encountering the simulated impediment.

The simulated hand, body part or inanimate object may be displayed graphically on a computer monitor, although it need not be. The simulated hand may be a physical robotic gripper.

In another embodiment of the invention, the method for constraining the graphical or simulated hand, body part or other articulated structure, may be incorporated into software or firmware or other recording medium. In a further embodiment, the software is provided as a computer program product tangibly stored or recorded in a medium, such as a computer disk, CDROM, or other formats as are known in the art.

Additional Technology Description

FIG. 1 shows a diagrammatic view of the relationship between a Host Simulation Application (101) and Virtual Technologies' VirtualHand Toolkit (VHT), a portion of which is the subject of this invention. FIG. 1 also shows the relationship between the VHT and a Hand Manager module capable of constraining the virtual hand from penetrating graphical objects. In particular, we describe a Hand-Interaction Scene Graph (or more generally, the Interaction Scene Graph), which functions within a Hand-Interaction Simulation. This hand-interaction scene graph interacts with a simulation's Master (a.k.a. World or Graphical) Scene Graph.

Before proceeding with the discussion of the details of the hand-constraint capabilities of the hand manager, we will provide a brief background description of the remainder of the supporting software architecture as provided in FIG. 1.

VirtualHand Toolkit

The VirtualHand Toolkit, which makes up a large portion of the supporting software, comprises the following three main components:
1. Hand-Interaction Simulation (H.I.S.) (104)
2. I/O Daemon (106)
3. Calibration Panel (107)

Hand-Interaction Simulation (HIS)

A central module of the VirtualHand Toolkit architecture is the Hand-Interaction Simulator (HIS) 104, which controls all hand interaction. It may be a separate process running on the host computer or, alternatively, if the Virtual Technologies CyberGrasp haptic-feedback system is used with the CyberGlove, the HIS may alternatively run on the CyberGrasp controller. The HIS comprises four major components:
1. Hand-Interaction Scene Graph (103) (or more generally, just Interaction Scene Graph)
2. Collision Manager (108)
3. State Manager (109)
4. Hand Manager (102)

A principle component of the HIS is a Hand-Interaction Scene Graph (HISG), which contains a node for each of the interactive objects of interest in the "hand scene." The hand scene is defined as all the objects that fall within a certain radius of the hand; this includes all the objects that form the hand itself. To assist with collision detection, each node may have a bounding sphere associated with it. Thus, one simple way to determine if an object falls within the realm of the graphical hand is to check for a collision (binary) with a large bounding sphere associated with the base node in the HISG. The bounding sphere of the base node of the hand can be used to determine the hand scene, i.e., the hand's region of influence. There are exceptions to this rule: If a linked object enters the hand scene, then all the other objects it is linked to, whether inside the bounding sphere or not, automatically are included in the hand scene. The same holds true for unlinked objects that are in contact with an object in the hand scene, as long as they remain in contact.

The HIS may also contain a State Manager (109) which is responsible for updating the state of each of the nodes that are in the scene graph. During each cycle through the HIS, the state manager traverses the HISG tree, assigning new states (e.g., positions, velocities, etc.) to the various dynamic nodes. If the HIS is not a process running on the host computer, typically, the state manager updates the states of the HISG running in the HIS only, and not the HISG in the host application. In such a case, typically only the HISG in the HIS will have the ability to synchronize with the corresponding HISG in the host application.

A Collision Manager (108) navigates the HISG and determines which dynamic nodes are colliding with one another. Static nodes are typically ignored by the collision manager. Support may include sphere/plane, sphere/box and sphere/sphere collisions, as well as other object collisions. The hand itself is part of the haptic scene graph and consists of multiple dynamic nodes. In one embodiment, we use multiple dynamic sphere nodes (i.e., contact spheres) in the fingers and hand to check for collision with other objects, while other embodiments may use multiple dynamic bounding cylinders on the phalanges of the fingers, and a bounding box on the palm, as an alternatives or in addition to the spheres. The collision manager has at least two objectives: to determine which two nodes (objects) are colliding, and to determine how deeply inside one another they are (i.e., the depth of penetration). The depth of penetration may be used to compute force feedback commands based on a stiffness model.

It should be noted that the nodes in the hand-interaction scene graph do not necessarily correspond exactly to the nodes in a graphics (e.g., the master) scene graph (105). For example, a complex shape could be rendered "as is" graphically, but from a haptic point of view, it would be represented by a bounding box.

In another embodiment, there is another Data Neutral Scene Graph (DNSG) for coordinating and linking data between the master (i.e., graphical) scene graph (105) and the HISG. The DNSG contains a node for each interactive element or other element of interest existing in either the graphical scene graph or the HISG. Elements of interest typically include elements which might change with time. When a DNSG is employed, the DNSG is typically the scene graph which is updated with each pass through the simulation loop. (That is, in effect, it becomes the "master" scene graph.) After the DNSG is updated, it passes the update information along to the corresponding node of the graphical scene graph and/or the HISG for updating. When a DNSG is used, the HISG typically sends force commands, or local force patch approximations, to an I/O Daemon (106) (discussed below) running on a force controller.

As discussed, the Hand Manager is responsible for dealing with all the specifics of hand interaction. The hand manager is also responsible for selecting the grasping mode and providing all manipulation algorithms. The hand manager is the process that sets the environment constraints, i.e., ensures that the graphical fingers don't penetrate a virtual object and that the graphical hand doesn't go through a graphical wall, etc. This is achieved by using two separate hand models: the ghost hand and the graphical hand. The ghost hand corresponds exactly to what is being measured by an instrumented glove and spatial tracker. The graphical hand is constrained by the objects, or other graphical impediment, in the virtual environment. When no objects or impediments are encountered, the two hands overlap completely and have the same configuration and location. When constraints or impediments are encountered, the correspondence ceases and the two hands may be modeled as linked via a network of virtual springs and dashpots. This ensures that when the user's real hand passes through a virtual wall and re-enters elsewhere, the graphical hand will be waiting at the appropriate location such that the two overlap again.

Figure 3:
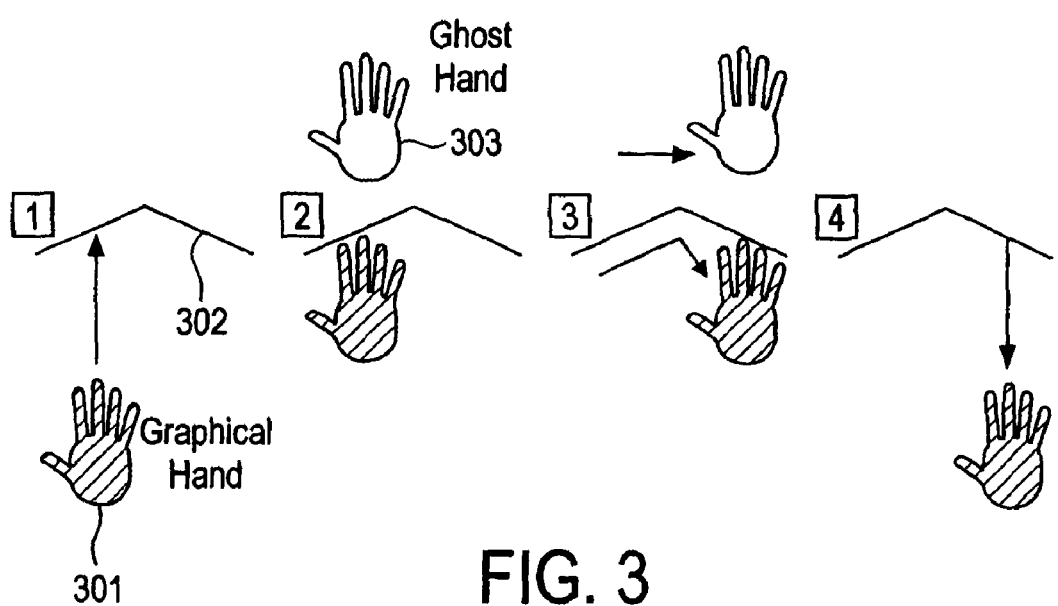
FIG. 3 shows an embodiment of where the graphical hand is following constraints as it tries to track the ghost hand.

This is illustrated in FIG. 3, where for simplicity, the hand configuration is shown to remain constant. In step 1, the graphical hand is approaching a wall. In step 2, the user's hand passes through the wall, but the graphical hand stops at the constraint. In step 3, the user's hand moves sideways while the graphical hand tracks the wall. In step 4, the user's hand backs away from the constraint and both hand models overlap.

I/O Daemon

The I/O daemon runs as a background process and is responsible for communicating with the hardware devices. For example, the daemon may acquire data from a Polhemus or Ascension electromagnetic tracker, and may also specify force and vibration setpoints to the CyberGrasp or Cyber-Touch (i.e., another Virtual Technologies haptic-feedback product) devices, respectively. The HIS communicates with the daemon via info packets that make the physical location of the daemon transparent to the user. It may run on a separate machine, such as the CyberGrasp controller, on the host itself, or any other computer on the network. The sensor stream is the data coming from the I/O daemon. The stream may include data from the CyberGlove and various 6D position trackers. The feedback stream may include force or vibration setpoints that are sent to the I/O daemon intended for a haptic system, such as Virtual Technologies' CyberGrasp or Cyber-Touch, respectively. Open-loop pre-defined functions such as Jolt, Vibration, Texture, etc., may also be included in the feedback stream.

Host Application

The VirtualHand Toolkit (VHT) may be used with a high-level software simulation package. Common commercial package examples include Sense8's World Toolkit™, Division's dView™, etc. In such cases, these applications (101) already have defined a graphical master (i.e., world) scene graph (105), and data must be extracted from the master scene graph to construct a hand-interaction scene graph (110). (Note also that a DNSG as previously described might preferably be constructed to efficiently communicate with the graphical scene graph and the HISG.) Hence, a custom plug-in (112) to the host application is required to permit the master scene graph to communicate with a host copy of the HISG. Such a HISG plug-in is shown in the host application and represents a host-application copy of the HISG. The master scene graph and the host application HISG copy may synchronize each other using the DNSG. They may also synchronize with each other using either of the following two communication methods: poll mode or call-back mode. In poll mode, the master scene graph requests the new data from the host application HISG and updates the master states itself. In call-back mode, the master scene graph passes a function pointer to the host HISG copy which then directly updates the object states in the master scene graph. When the HIS is running on a separate computer, such as a force controller, then a "mediator" process running in the HIS lets the HISGs running in the host application and in the HIS update one another asynchronously.

Most commonly, when using the toolkit, the user will modify the Application software such that a hand-interaction scene graph may be constructed from, and/or communicate with, the master scene graph (or alternatively, the DNSG). Typically, applications using the VirtualHand Toolkit fall within three scenarios:

Scenario #1

The VHT is being used with a third party software package such as the world-building toolkits provided by Sense8 Corp., Division Inc. and Deneb Robotics Inc. In this case, the applications already have a master scene graph (105) and data must be extracted from it to construct a hand-interaction scene graph (110) (and/or a DNSG (111)) residing on the host. If the HIS is running on a separate computer, such as a force controller, then this hand-interaction scene graph may be copied over to the HIS and the two are updated asynchronously. This is done because the simulation running on the host will typically run at a much slower rate than the simulation running on the dedicated CyberGrasp controller. A high servo rate is desirable for high-fidelity feedback.

Scenario #2

In this scenario, an application (114) that is "interaction scene graph aware" is being written from the ground up using OpenGL, OpenInventor, etc. In this case, the interaction scene graph (113) may be directly incorporated into the master scene graph.

Scenario #3

In some instances, the users might want to bypass the interaction scene graph altogether and write their own hand interaction simulation (116). In these instances, they can communicate directly with the I/O daemon to read data from the devices and control them directly vial a connection (115).

Embodiment

Figure 2:
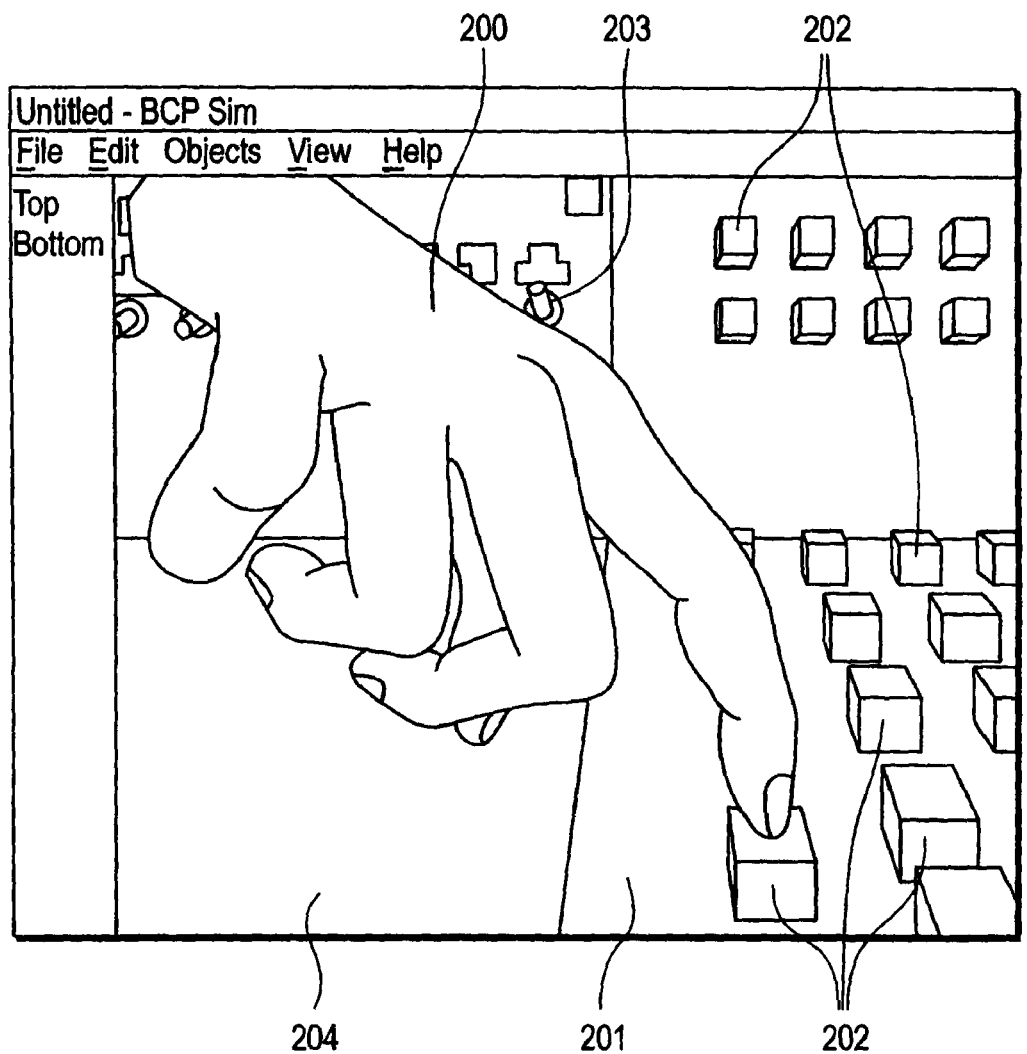
FIG. 2 shows a demonstration (computer screen capture) using the VirtualHand Toolkit to generate a graphical hand which is constrained to not penetrate a control panel and associated buttons.

An embodiment which illustrates the functionality of the VirtualHand Toolkit consists of a simulation of a virtual control panel (201) (FIG. 2). The user (200) may interact with the control panel and buttons using a CyberGlove instrumented glove, and optionally with a CyberGrasp force-feedback device. The control panel contains grounded objects (202) and surfaces (204), in addition to push buttons and toggle switches (203). When the CyberGrasp force-feedback device is used, the user can also feel the resistance of the buttons being pressed.

Figure 4:
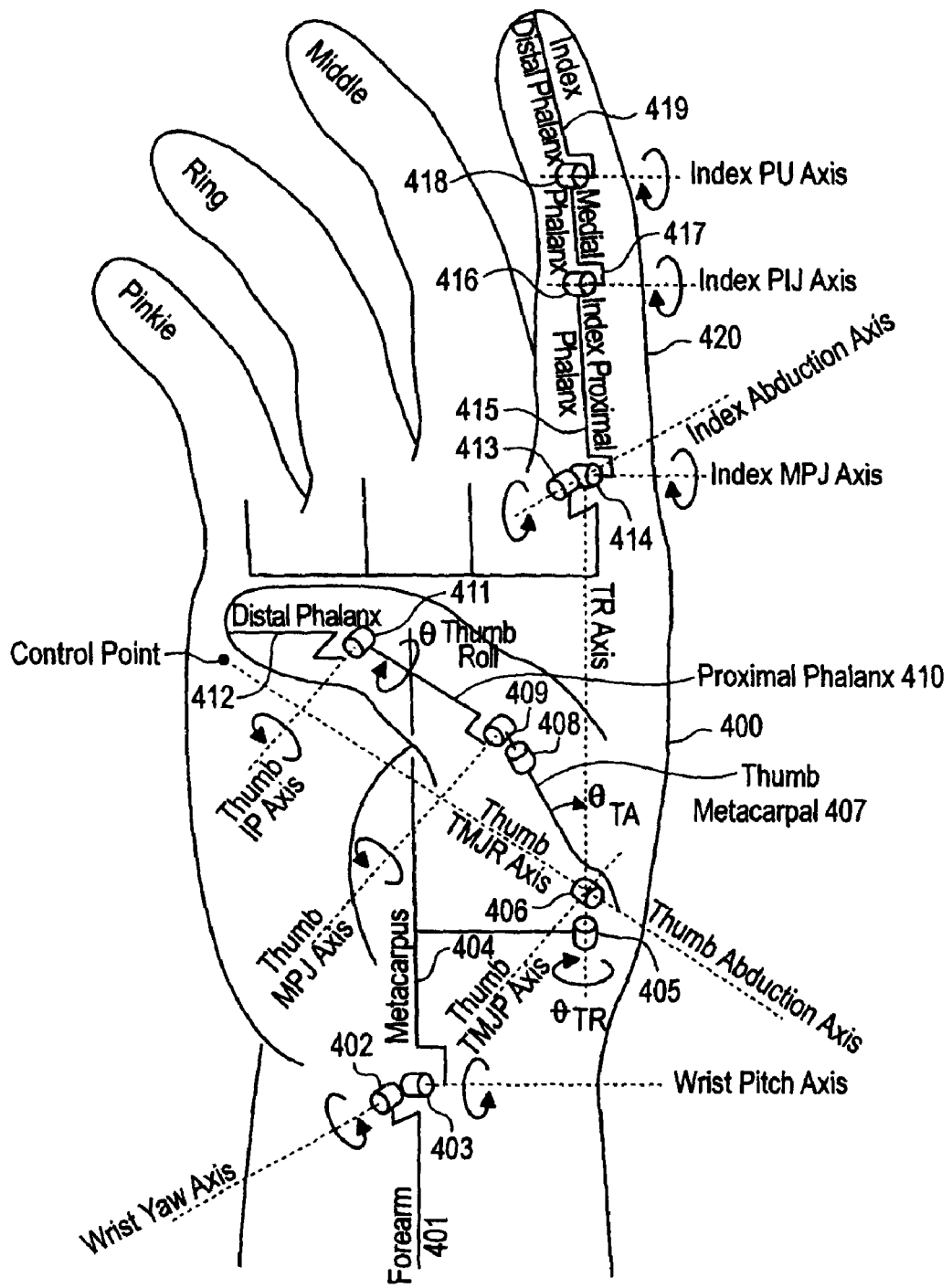
FIG. 4 is a diagrammatic view of an embodiment of a joint-link model of a human hand and forearm.

FIG. 4 is a link-revolute-joint model of the human hand (400). The forearm link (401) is connected to the wrist yaw joint (402) which is connected to the wrist pitch joint (403). This joint is connected to the metacarpus link (404) which extends to connect to the thumb roll joint (405). This joint is connected to the thumb abduction joint (406) which is connected by the thumb metacarpal link (407) to the thumb metacarpal roll joint (408). This joint is connected to the thumb MP joint (409) which is connected by the thumb proximal phalanx (410) to the thumb IP joint (411), which is connected to the thumb distal phalanx (412). The hand metacarpus link (404) also connect to the joints at the base of each of the fingers (420). It connects to the index abduction joint (413), which connects to the index MP joint (414). The index MP joint is connected by the index proximal phalanx link (415) to the index. PI joint (416) which is connected by the index medial phalanx link (417) to the index DI joint (418) which ultimately connects to the index distal phalanx link (419). The structure is similar for each of the middle, ring and small fingers. Such a link-revolute joint hand model is described in Kramer's U.S. Pat. No. 5,482,056, "Determination of Thumb Position Using Measurements of Abduction and Rotation." Link-revolute joint models for the entire human body are described in Kramer's U.S. Pat. No. 5,676, 157, "Determination of Kinematically Constrained Multi-Articulated Structures."

Figure 5:
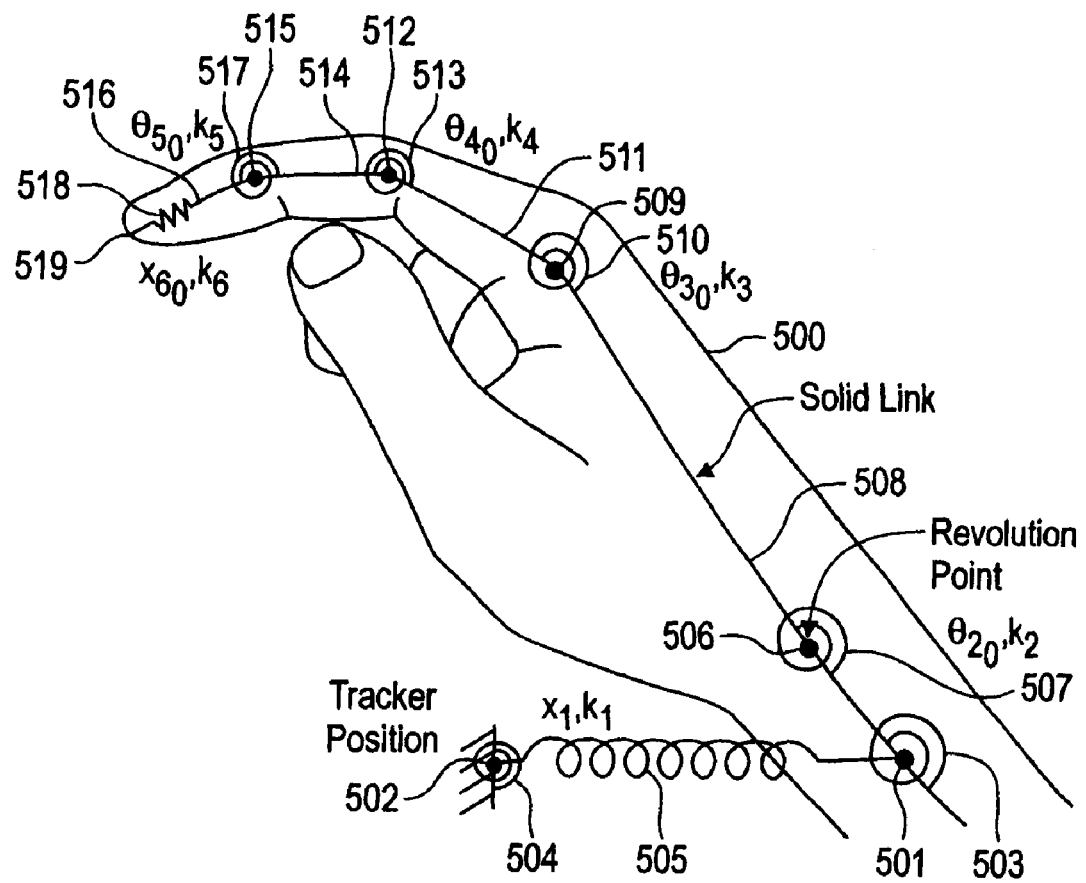
FIG. 5 is a diagrammatic side view of an embodiment of a spring model for the graphical hand, including a joint-link model of the human hand and forearm, with associated joint springs and tracker springs.

FIG. 5 provides one embodiment for constraining the virtual hand at the surface of a virtual object. The concept is as follows. Associated with the measured physical hand of the user are two computer-simulated virtual hands, one is a graphical hand which is rendered, and the other is a "ghost" hand, which is not displayed, but given the measurements of the hand reproduces as precisely as possible the movements of the physical hand. The graphical hand (500) is modeled as having springs at each of the joints (e.g., one or more of the joints in FIG. 5), in addition to a spring at the fingertip and one at the wrist. The unstretched, i.e., zero position of each joint spring (e.g., $\Delta x_{10}$ and $\Delta \theta_{20}$, etc.) is defined by the corresponding joint angle of the ghost hand. The unstretched position of the wrist spring is defined by the position of the ghost wrist position, and the unstretched position of the fingertip spring is defined by the distance from a point about ¼" into the fingertip out to the fingertip surface when it isn't in contact with an object.

In FIG. 5, the position and orientation of the hand is measured to correspond to when the forearm attachment point (501) and the tracker position point (502) coincide with coordinate frames aligned, i.e., the corresponding orientation springs (503) and (504) are unstretched. Note that in general, the forearm attachment point and the tracker position point represent 3 degrees of freedom of orientation capability each, and thus have 3 rotary springs each. When the hand is at the tracker measurement, the tracker translation spring (505) is also unstretched and has zero length. To illustrate the tracker translation spring with spring constant $k_1$ (a.k.a. Young's Modulus), the graphical hand is shown displaced from the measure position by $x_1$. Note that the tracker position point may be selected to be at a variety of locations, such as the forearm link (as is shown here), the metacarpus link, or even a point distal to the physical hand. The placement of the tracker position point will affect how simulated impediments will affect the movement of the hand.

Continuing with FIG. 5, the forearm link is connected by the wrist joint (506), with rotary spring (507) to the metacarpus link (508). Actually, the wrist joint as shown typically comprises two orthogonal joints, a wrist flexion (pitch) and wrist abduction (yaw). For clarity, the double joint is shown as a single wrist flexion joint. The rotary spring associated with this joint has spring constant $k_2$, and is unstretched at an angle of $\theta_{20}$. The metacarpus link is connected by the metacarpophalangeal joint (509), with corresponding rotary spring (510), to the proximal phalanx (511). As with the wrist, the metacarpophalangeal joint actually comprises two orthogonal joints, one for flexure and one for abduction. For clarity, this double joint is also shown as a single point. The rotary spring corresponding to the flexure of this joint has spring constant $k_3$, and is unstretched at an angle of $\theta_{30}$. The proximal phalanx is connected to the PI joint (512), which has a rotary spring (513) of spring constant $k_4$ and is unstretched at an angle of $\theta_{40}$. The PI joint is also connected to the medial phalanx (514). The medial phalanx is connected by the DI joint (515) to the distal phalanx (516). The DI joint has a rotary spring (517) of spring constant $k_5$ and is unstretched at an angle of $\theta_{50}$. Finally, the distal phalanx has a spring (518) to the fingertip (519), which represents the compliance of the fingertip. This spring has spring constant of $k_6$, and is unstretched when at a length of $x_{60}$.

Figure 6:
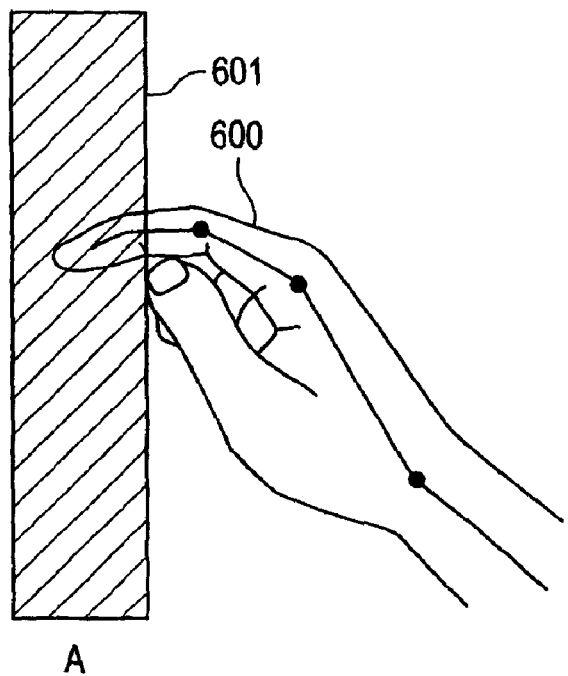
FIG. 6 is a diagrammatic view of an embodiment of: (A) ghost hand and (B) graphical hand with springs compressed due to constraint of the compliant wall.
Figure 6:
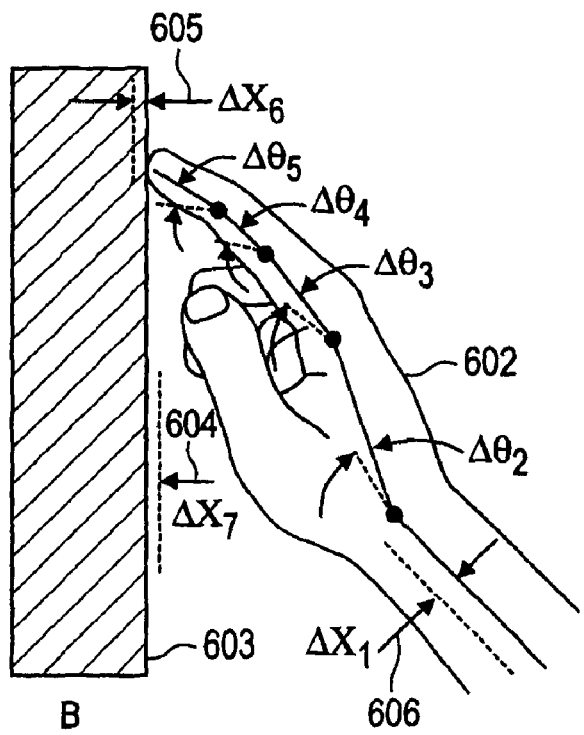

When the graphical hand contacts an object, the hand flexes such that the solid links articulate at the revolute joints in relation to the stiffnesses of the associated joint springs. FIG. 6 shows the embodiment where the graphical hand contacts a compliant surface. FIG. 6A shows the ghost hand (600), which represents the true configuration of the physical hand, positioned relative to the object surface (601), while FIG. 6B shows the graphical hand (602) ultimately drawn after it "flexes." Note that in this example, the surface (603) is also shown to translate to the left (604) due to a modeled spring stiffness of the surface, where, in this example, the stiffness is on the order of stiffness of the hand springs. The fingertip of the hand (602) is shown to compress by an amount $\Delta x_6$ (605), in addition to the other rotary joints angles also being modified. The tracker position is also shown to translate by an amount $\Delta x_1$ (606).

The graphical hand, which may employ virtual springs at one or more of its joints such that it may bend naturally, is typically the hand used to actually compute simulated interaction forces for the embodiment where the CyberGrasp system, or some other haptic-feedback display, is used. The hand manager may include a generalized hand-constraint procedure that solves the hand-spring model given a list of constraining impediment collisions from the collision manager. It should be obvious to one skilled in the art of mathematics and dynamic simulation how to solve the multi-articulated spring model given a set of constraints.

It has been shown that when the visual display contradicts one's proprioception about where their hand is, the visual display dominates. Thus, it is typically more disconcerting for an individual to see their hand penetrating an object they know they should be unable to penetrate, than it is for their graphical hand to stop at the surface of the object, even though the individual's physical hand actually moves slightly past.

A separate "constraint model" may be associated with each colliding digital object, built up from a variety of shape primitives for which the hand manager knows how to interpret constraints. In this way an "object filter" is created which automatically fits such shape primitives to an arbitrary digital object to generate the constraint model. Such a constraint model may also be employed as a simplification of the true digital object for collision-detection and depth-of-penetration calculations for force-feedback.

Figure 7:
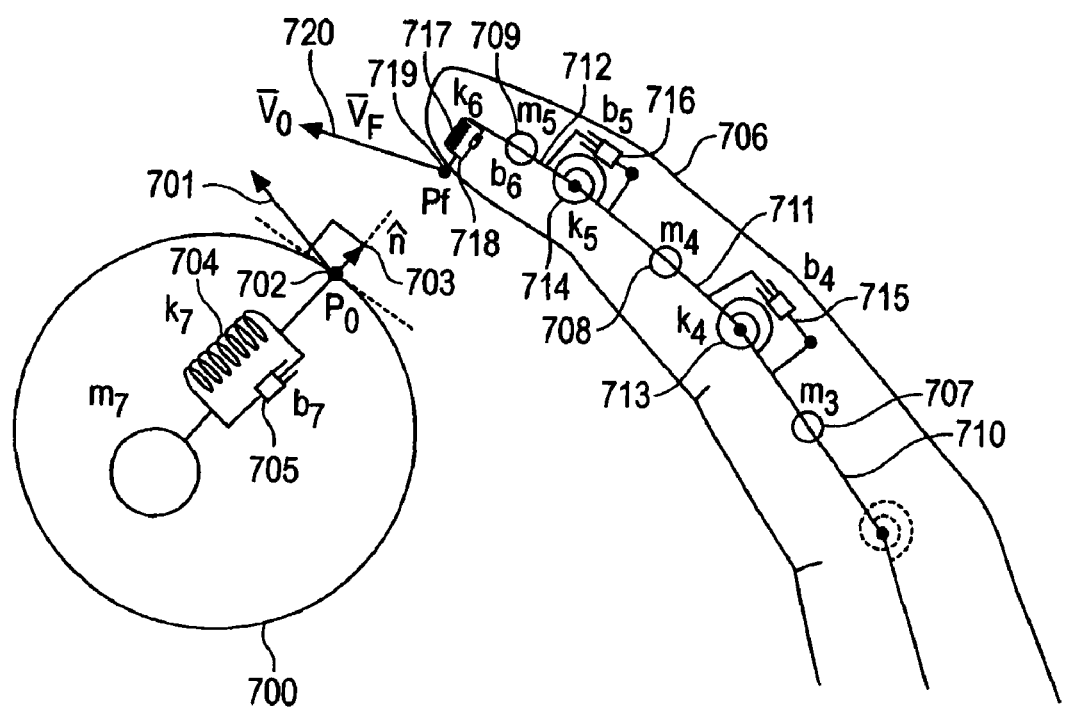
FIG. 7 is a diagrammatic view of an embodiment of a spring-mass-dashpot model for the hand for use in dynamic situations.

With respect to a further embodiment of the invention, it is noted that the hand-spring model provided thus far in FIGS. 5 and 6 is purely a static model, i.e., it does not account for dynamic properties of the hand or object, such as mass and damping. Thus, the response to impact between the hand and an object with mass can only be evaluated in the steady state; reactions to impacts must be ignored. FIG. 7 provides an extension of the hand-spring model to a hand-spring-mass-dashpot model for use in dynamic calculations.

In the embodiment illustrated in FIG. 7, object $m_7$ (700) is traveling with velocity $v_o$ (701) at point $p_o$ (702) with normal n (703). Point $p_o$ is coupled to the lumped-mass model mass of $m_7$ via spring (704) with spring constant $k_7$ and dashpot (705) with damping $b_7$. The finger (706) now has masses $m_3$ (707), $m_4$ (708) and $m_5$ (709) associated with the links (710), (711) and (712) as shown, rotary springs (713) and (714) with spring constants $k_4$, $k_5$, and rotary dashpots (715) and (716) with damping factors $b_4$, $b_5$ associated with the joints as shown, and spring (717) and dashpot (718) $k_6$ and $b_6$ between the end of the finger solid link (712) and the contact point $p_F$ (719) at the fingertip which is traveling with velocity $v_F$ (720). With such a model, upon impact between the object and the finger, the fingertip will compress and the finger will recoil based upon the dynamics involved. Note that when the velocities (and higher order derivatives of position) are known for the fingertip and object, at a particular time step, the hand-interaction scene graph can be updated to include objects that are estimated to enter the sphere of interest and impact within the next few update cycles.

The dynamic hand-spring model of FIG. 7 provides a model for determining hand constrains and manipulation of free-floating objects which might be moving at the time of contact with the virtual hand. In such cases, one might want to have a virtual finger recoil upon impact with the object, before the finger returns to a steady-state position. An example of such a free-floating object is a baseball, coffee cup or soda can. For free-floating object manipulation, various physics-based manipulation algorithms may be employed without departing from the scope and intent of the invention. To determine a stable grasp of the free-floating object using the virtual hand requires solving a system comprising multiple objects which yield an over-constrained contact problem: The fingers and the palm area of the virtual hand are essentially six objects which interact with the object to be manipulated.

Figure 8:
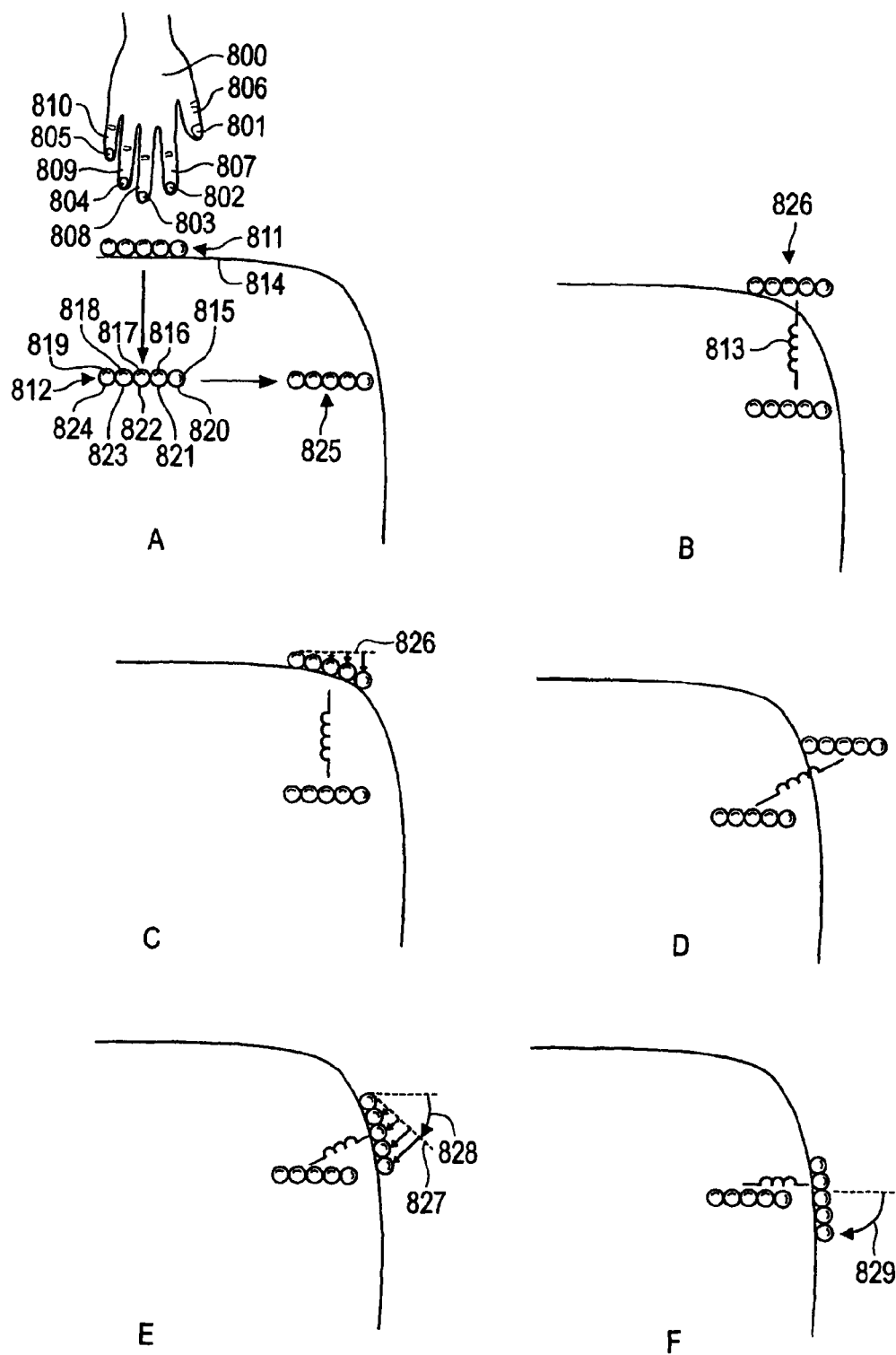
FIGS. 8A-8F are diagrammatic views of various embodiments of a spring models for the graphical hand.

FIG. 8 show various example in which a simulated graphical hand can be constrained to flex, translate and rotate relative to the measured ghost hand based on a curved surface impediment. These and other combinations of flexure, translation and rotation are obtained by adjusting the relative stiffnesses of modeled springs corresponding to the various articulated degrees of freedom of the finger joints, wrist, tracker, etc. FIG. 8A shows the top view (800) of a simulated graphical hand controlled by a physical hand. The fingernails (801, 802, 803, 804 and 805), respectively, of the thumb (806), the index (807), the middle (808), the ring (809) and the small finger (810) are shown to provide perspective when the hand is rotated to an end view (811).

In FIG. 8A, the ghost hand separates from the simulated graphical hand (811) at the surface of the impediment (814) and moves to a first position (812). The ghost hand then translates to the side to a second position (825). The ghost hand has fingernails (815, 816, 817, 818 and 819) of the thumb (820), the index (821), the middle (822), the ring (823) and the small finger (824). Note the subtle changes in orientation of the fingernails to help understand how the measured joint angles, orientation and spatial placement of the hand are modified in each figure to produce the resulting simulated graphical hand.

FIG. 8B shows how the simulated hand moves to a new position (826) which, due to the curvature of the impediment surface, and the attractive force of the tracker translation spring shown here generically (813), is slightly closer to the ghost hand in its second position than the simulated hand was to the ghost hand in its first position. One technique to solve the model for the final configuration and spatial placement of the hand is, based on the choice of spring constants and joint-link structure, to determine what configuration and spatial placement corresponds to the lowest total spring energy state. In this example, the simulated hand is only allowed to translate along the same direction vector as originally caused the ghost hand to split off from the simulated hand.

FIG. 8C shows an embodiment similar to 8B; however, the fingers of the simulated hand are permitted to flex so that the simulated hand is closer to the ghost hand, again this position may be determined to result in a lower total spring energy state. Note that in this embodiment, the simulated hand is not allowed to modify its orientation. The dashed line (826) denotes the orientation of the simulated palm (i.e., metacarpus) from which the fingers flex to reach the surface.

FIG. 8D shows an embodiment where the simulated hand is allowed to translate along an arbitrary vector to find the shortest tracker-spring distance (i.e., disparity) to the ghost hand, thus minimizing the total spring energy. Note that again in this case, the simulated hand is not allowed to modify its orientation.

FIG. 8E shows an embodiment which combines the finger-flexing capability of 8C with the arbitrary translation direction of 8D, in addition to allowing the entire simulated hand to modify its orientation. The dashed line (827) denotes the modification of orientation angle (828) of the simulated palm from which the fingers flex further to reach the surface. The amount that the orientation is modified, relative to the amount that the spatial placement of the hand translates from the measure tracker spatial placement, relative to the amount that each joint on each finger flexes beyond the corresponding measured joint flexure, is determined by the relative spring constants, with the goal of minimizing the total spring energy.

Finally, FIG. 8F shows an embodiment where the fingers of the simulated hand are not allowed to flex, but the palm of the simulated hand is allowed to modify its orientation angle (829) in order to minimize the total spring energy.

Figure 9:
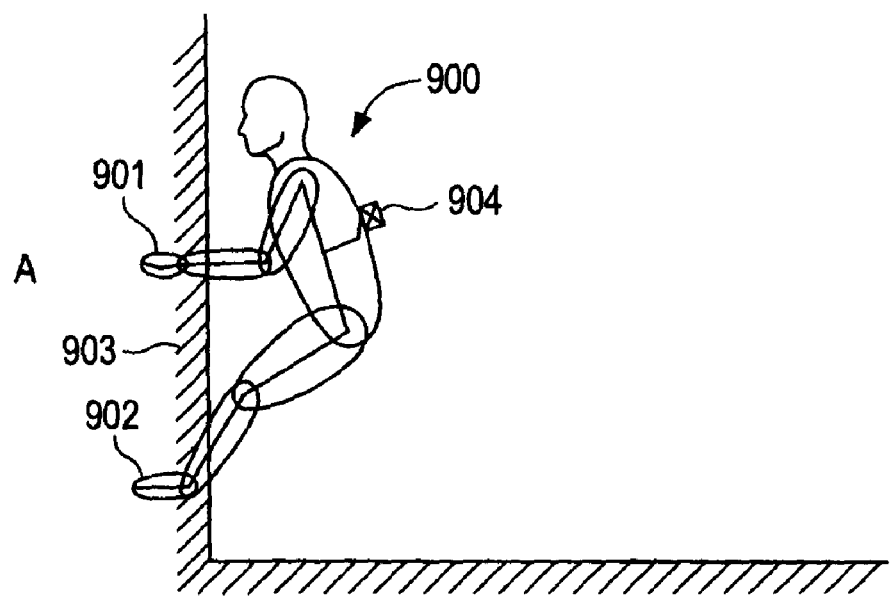
FIG. 9 is a diagrammatic side view of an embodiment of a spring model for a portion of a graphical human figure, with associated joint springs and tracker springs.
Figure 9:
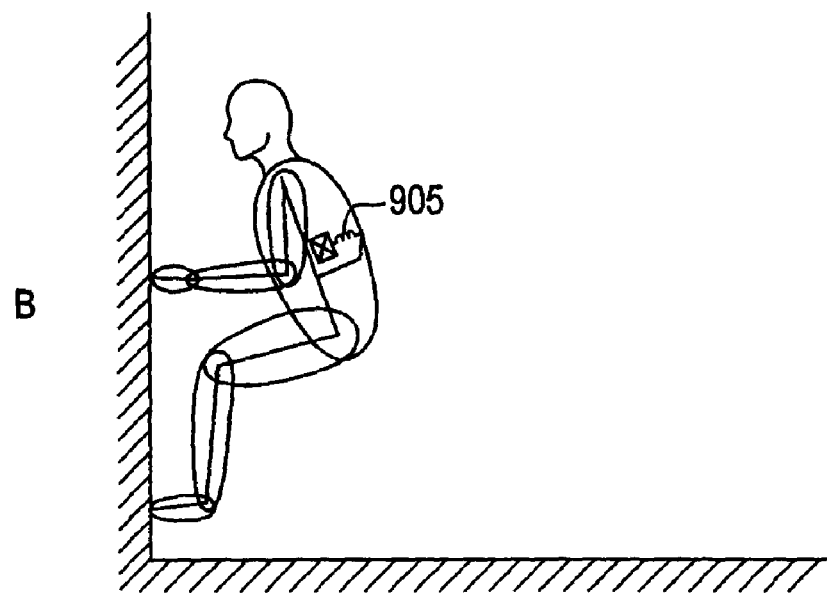

FIG. 9 shows an embodiment where various limbs of a simulated body, typically controlled by measurements of a corresponding physical body, are constrained to not penetrate a simulated wall impediment. In FIG. 9A, both the hand (901) and foot links (902) of a simulated body (900) are penetrating a wall (903). The tracker element (904) is shown fastened to a position on the body. In FIG. 9B, the various joint angles of the simulated limbs are shown modified. Additionally, the translational position of the entire torso is shown modified by the spring (905). The resulting modification of measured values provides the result that no part of the simulated body penetrates the impediment.

Figure 10:
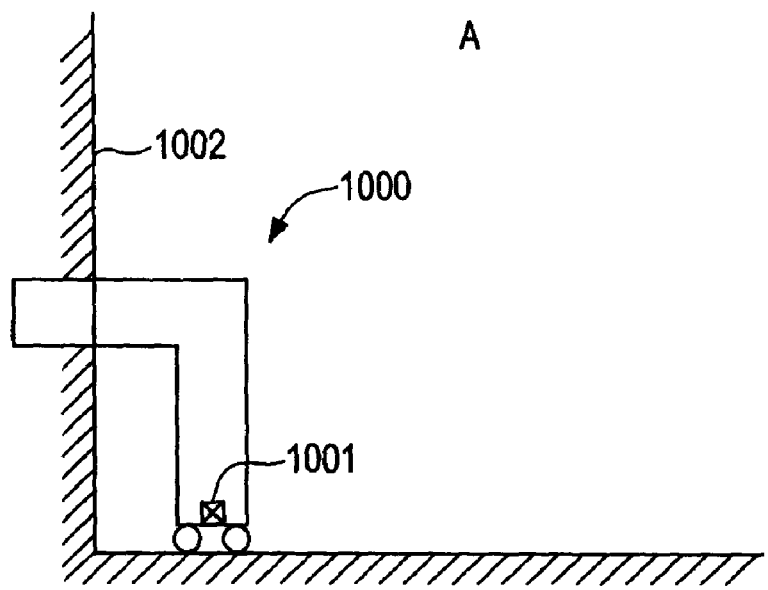
FIG. 10 is a diagrammatic side view of an embodiment of a spring model for a portion of a generic mechanical structure, with associated joint springs and tracker springs.
Figure 10:
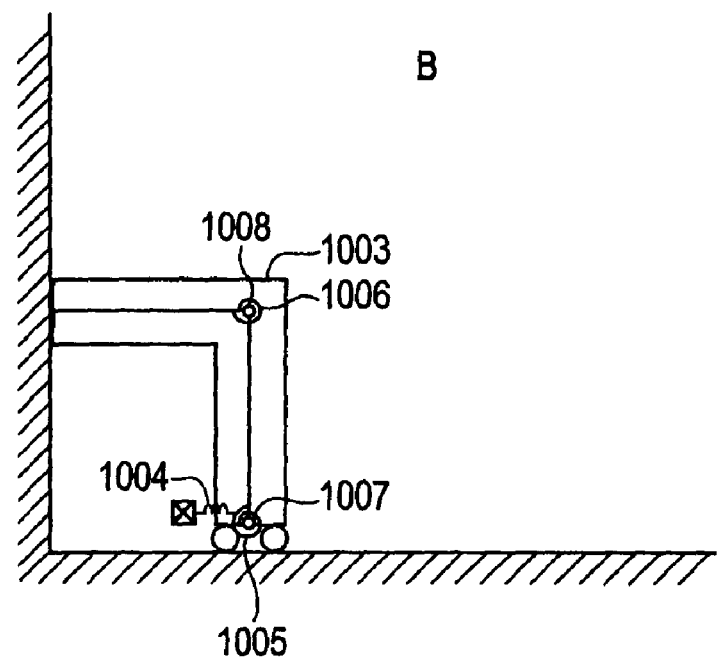

FIG. 10 is an embodiment comprising a simulated inanimate object (1000), where the spatial placement of the object is measured, for instance by a sensor (1001), and the configuration of the simulated object is either measured or otherwise known. In FIG. 10A, the measurement value of the physical object causes the corresponding ghost object to penetrate a simulated wall (1002). In FIG. 10B, the measurement of the spatial placement has been modified, due to extension of a simulated spring (1004), and additionally, the object is simulated to flex, such that the simulated object no longer penetrates the wall. The flexure may be at an intended joint, or may be due to flexure of a compliant member (1003). The simulated object is shown here with rotary springs (1005 and 1006) about flexure joints (1007 and 1008).

To one skilled in the art there may be several techniques for how to formulate and solve for the configuration and spatial placement of an articulated system with allowable compliance. One way to solve such a system is to mathematically model the articulated structure with springs as shown above and then solve for the steady-state angles and positions of the links. In one embodiment, a closed-form solution exists. In another embodiment, an iterative approach might be faster to calculate or provide a more stable mathematical calculation or be more quickly solved on a data processor.

Although the joint-link-spring model provides a convenient and intuitive way to visualize how to modify measured values to produce a simulated hand (for instance) configuration and spatial placement such that it does not significantly penetrate another simulated object, the spring model is not necessary to use to develop a technique for accomplishing the same goal. Thus, in broad terms, this invention discloses a general idea and method for modifying, based on simulated impediments, measured control values to constrain a simulated hand, body part or other articulated inanimate object.

The spring model also gives an intuitive way to visualize what should happen when the simulated impediment moves or is removed. In general, the simulated hand will return to a position consistent with unmodified measured values. In general, the spring model provides a vector of attraction, so it is easier to visualize what the algorithm will do in a situation. However, the spring model may be replaced by an abstract, non-linear force vector, with properties that define how the simulated hand or object will deviate from, and then return to coincidence with, the measured hand or object in a given situation where a simulated impediment exists.

One benefit of this invention is an improved perception of interaction with solid objects by a user who is (a) not using a force-feedback device, or (b) is using a force-feedback device with inadequate stiffness.

One exemplary technique is provided below, where the technique for stopping a graphical hand from penetrating a graphical object is accomplished by calculating an offset with is added to the measured value, such that the graphical hand will not penetrate a graphical impediment. That is, the offset which is determined and added to the measured value, accounts for spring compliance.

We often refer to a ghost-hand algorithm as a method for modifying a measured value to ensure that a simulated hand (or object) does not significantly penetrate another object. The simulated hand (or object) based on the unmodified measured values is referred to as the ghost hand.

Nomenclature and Definitions

In the following sections, we use upper case roman letters to denote matrices, A, B, etc. We use lower case roman letters to denote vectors, scalars and functions. For geometric objects A and B, the local coordinate frames relative to a global origin, O, are defined by $^o_A T$, $^o_B T$, respectively, or more simply just $_A T$ and $_B T$ when it is clear that the coordinate frames are relative to origin, O. $_A T$ is a homogeneous transformation matrix which transforms vectors defined in the frame of object A to become vectors defined in the global frame, O. Frame transformations are equivalent to matrix multiplication if the transformations are represented as homogeneous 4×4 matrices and vectors are homogenous. Note that such matrices are always invertible.

Collision Manager

A fundamental component of our ghost-hand algorithm is the ability of the Collision Manager to track collision witness points on both the hand and the environment. We refer to Collision Tracking as the function which determines a coherent (i.e., continuous in time) reference surface (e.g., a continuous set of tangent planes) that separates the hand from the environment at all times. Our collision tracking algorithm relies on accurate collision detection and proximity queries.

Figure 11:
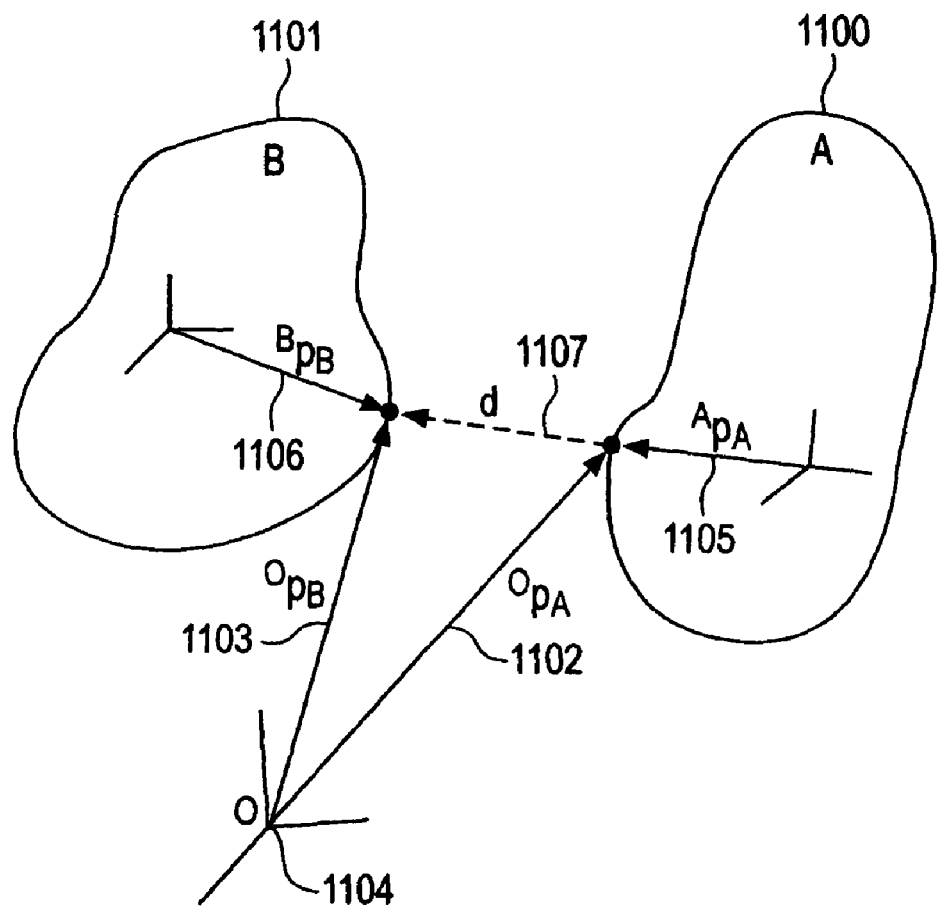
FIG. 11 is a diagrammatic view of two objects, A and B, with various critical elements identified.
Figure 12:
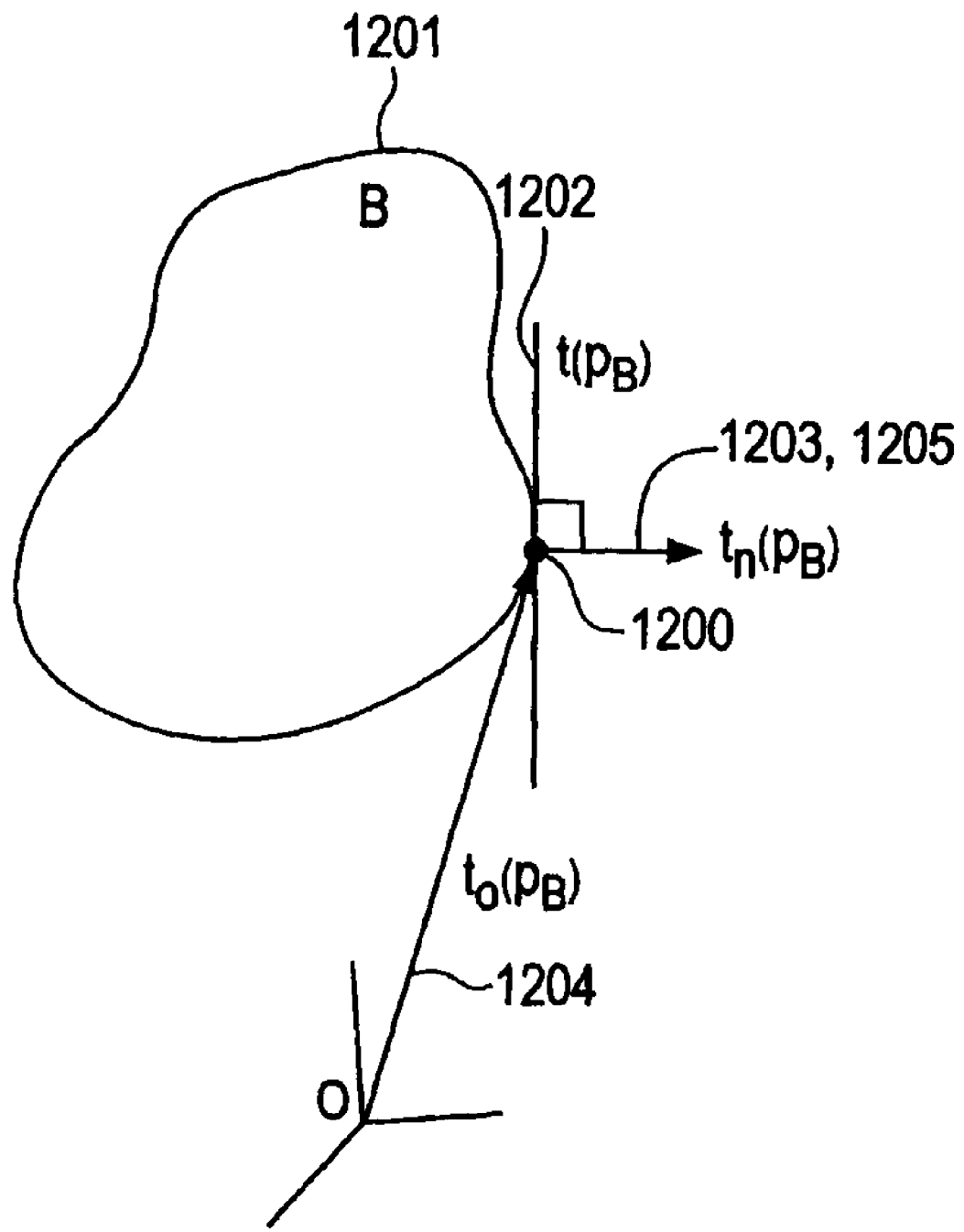
FIG. 12 is a diagrammatic view of objects A, with various critical elements identified.

For the case where the regions in question of objects A and B have large radii of curvature, collision tracking operates as follows: Consider two objects A (1100) and B (1101). To track object B with respect to object A, we first determine the closest points on the surface of both objects (see FIG. 11). These two points are known as witness points and will be referred to as $^o p_A$ (1102) and $^o p_B$ (1103), respectively, i.e., represented in the global inertial reference frame, O (1104). When the reference frame is understood to be the inertial reference frame, the notation will be simplified to $p_A$ and $p_B$, respectively. The same two vectors, but represented in the local frame of each object will be denoted $^A p_A$ (1105) and $^B p_B$ (1106), respectively. This initial step only works if the two objects are initially disjoint. The point (1200) on the surface of object B (1201) is used to construct the surface tangent plane $t(p_B)$ (1202) (see FIG. 12). This tangent plane has a normal (1203) whose projection onto the line (1107) joining $p_B$ with $p_A$ is positive if object A and object B are disjoint. We denote $t_o(x)$ (1204) and $t_n(x)$ (1205) as the offset and normal, respectively, of the tangent plane at point x, represented in the global frame.

MTD (minimum translational distance) is defined as the length of the vector that joins $p_B$ to $p_A$ if $p_A$ is exterior to object B. If $p_A$ is inside object B, the MTD is defined as the negative of the length (magnitude) of this vector.

At the beginning of each new time step, after the object positions have been updated, the collision query algorithm is run again, and new values for $p_A$ and $p_B$ are calculated. The tangent plane is updated while the MTD is greater than 0. When the point $p_A$ lies inside object B, the dot product of the line joining $p_B$ to $p_A$ with the tangent plane normal will become negative. This test is used to determine when to transition the tracking algorithm from "tangent-plane-update mode" to "witness-point-projection mode." Another possible test is to check the sign of the MTD as returned by the collision-query algorithm.

We define a collision event as the transition from positive to negative MTD. We denote by $p_{A0}$ and $p_{B0}$ the witness points on objects A and B immediately before a collision event. Thus the tangent plane at a collision event is $t(p_{B0})$. We cache (save) the local frame witness point $^A p_{A0} = ^A p_A$ at the time of the collision event (we also refer to $p_{A0} = _A T \, ^A p_{A0}$)

Once a collision event has occurred, the tangent plane is no longer updated as discussed above. Instead, at the beginning of each new frame, we check the current MTD as returned by the collision detection algorithm.

If the MTD is positive, we return to the above algorithm since object A and object B are again disjoint. In addition, we use the component of $p_A$-$p_B$ along $t_n(p_B)$ as the offset vector $o_{An}$ (where the n denotes "normal"). This offset vector is the ultimate output value for this collision-tracking algorithm.

Figure 13:
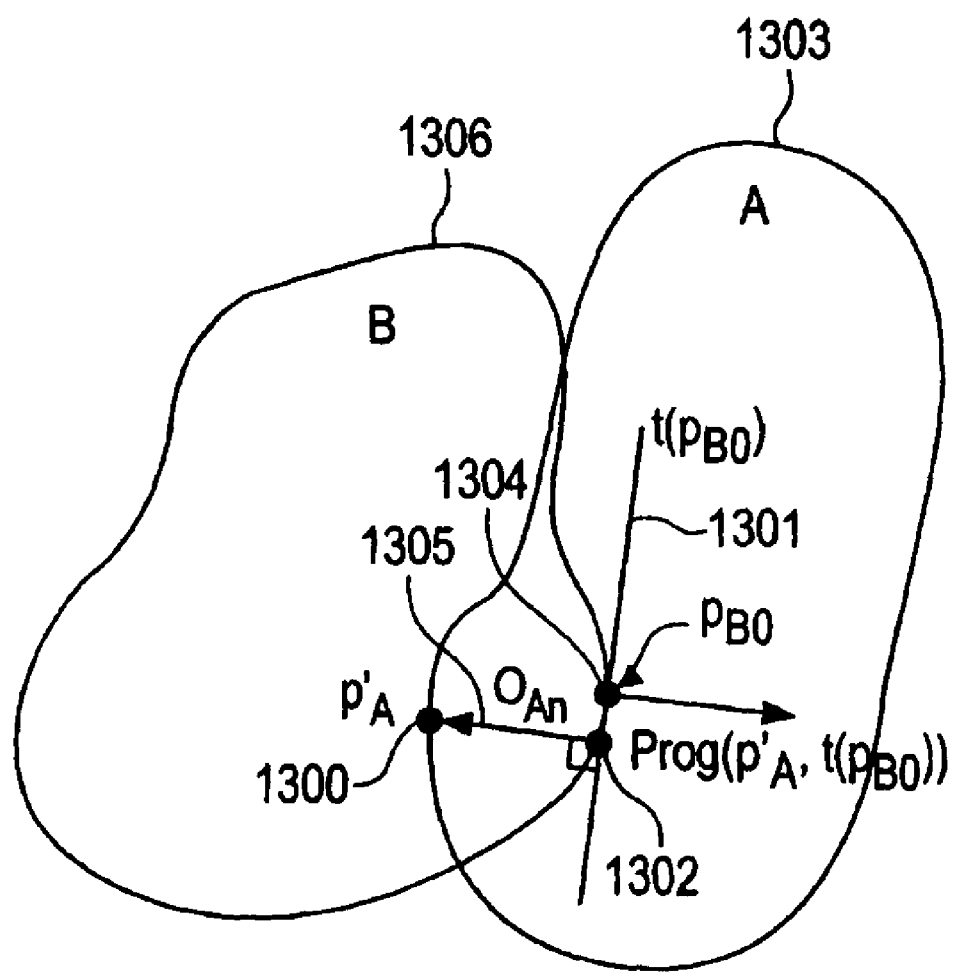
FIG. 13 is a diagrammatic view of two intersecting objects, A and B, with various critical elements identified.

If the MTD is less than or equal to zero, we calculate $p'_A = _A T \, ^A p_{A0}$, where $_A T$ is the current frame transformation for object A, i.e., at the present time step. Since object A moves, in general $_A T$ changes also. Thus, $_A T$ will not be the same frame as at the beginning of a collision, and so the calculated vector p'A (1300) also will not correspond to $p_{A0}$. The projection of $p'_A$ onto $t(p_{B0})$ (1301), Proj($p'_A$, $t(p_{B0})$) (1302), gives the tracked witness point for object A (1303). The projected point is the closest point on the plane, tangent to B (1306) at $p_{B0}$(1304), to the current position of the contact witness point $p'_A$. We define the witness offset as the difference Proj(p'A, $t(p_{B0})$)−$p'_A$. This offset is always a vector normal to the tangent plane, and is denoted $o_{An}$ (1305). See FIG. 13.

The output of the collision tracking algorithm is an offset vector lying in the direction of the normal to the surface tangent plane of object B and, when objects A and B are disjoint, gives the displacement vector necessary for object A to just touch object B. We denote this collision-tracking algorithm by the function c operating on two objects, A and B, as $o_{An}$=c(A, B).

Ghost-Hand Algorithm—Using Only Tracker Offset

Given the collision-tracking algorithm c(A,B), we construct the tracker-offset-based ghost-hand algorithm for an articulated human-hand geometry with hand-like kinematics. We assume our hand model is constructed from a set of primitives that a collision algorithm (such as c(A,B)) can use to find witness points. Examples of this include: (1) convex polytope geometries along with a GJK (Gilbert, Johnson and Keethri)-based collision algorithm, and (2) convex NURBS geometries along with the corresponding enhanced GJK collision algorithm. Note that other geometry-algorithm pairs are possible.

Figure 14:
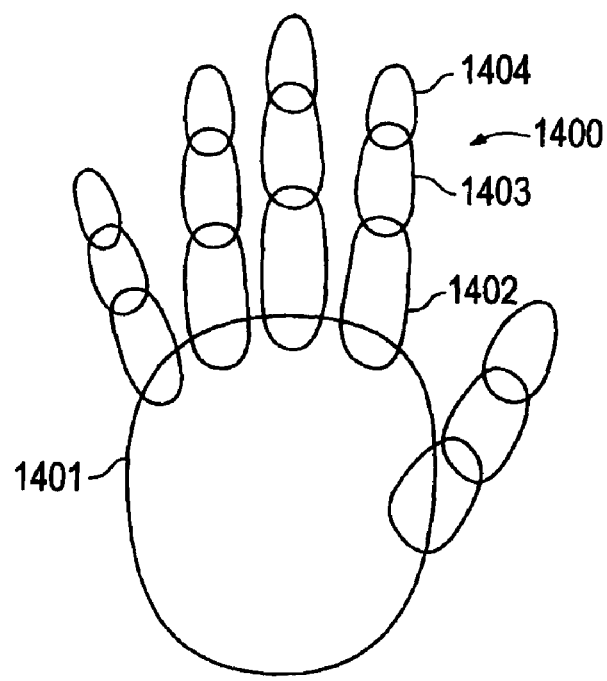
FIG. 14 is a diagrammatic view of the palm of the hand.

An example of a convex polytope geometry is shown in FIG. 14. The hand (1400) consists of 16 convex polyhedra that represent the palm (1 polyhedron) (1401) and each finger (3 polyhedra per finger, i.e., the proximal (1402), medial (1403) and distal phalanges (1404)).

For each component of the hand geometry model, we record the offset vector. For a 16-component hand model, this results in an array of 16 offset values per frame. For scenes containing more than one non-hand object, only the closest of each pair is used for collision tracking. A collision pair is any collection of two objects, exactly one of which is a hand geometry component. The array of offsets will be denoted as $O_{Hn\_j}$, with j=1 . . . N (where N is the number of hand-geometry components).

Once the array of offsets has been obtained, we determine the differential tracker offset value for the hand. This is computed as follows:

Let J be the subset of the N finger-geometry components with MTD<=0. Then for each k in {x,y,z}, we find j' such that $$j' = \underset{j \text{ in } J}{\mathrm{argmax}} \| o_{Hn\_j(k)} \|$$

and set $$\Delta oH(k) = o_{Hn\_j'(k)}.$$

This result for each vector component, x, y, z, is used to update the overall tracker offset vector $$o_H = o_H + \Delta o_H.$$

In situations where the hand position contains a small noise component, this update is only performed if the magnitude of $\Delta o_H$ is greater than some epsilon.

At each time step of the algorithm, we keep a counter $n_e$ of the number of hand components whose MTD is greater than some small positive constant, e. While $n_e$ is non-zero, the differential offset update procedure proceeds as above. While $n_e$ is zero, the update procedure is changed to $$o_H = \rho * o_H,$$

where ρ is a non-negative scalar value less than 1. This gives exponential convergence of the tracker offset to zero. In addition, if $\|o_H\| < e_c$ (for some small positive $e_c$), we set $o_H = 0$. Setting ρ=0 gives one step convergence of the hand offset back to correspond to the measured tracker values. Additionally, after performing a convergence step, the tracker offset may be recalculated before displaying the hand, since the convergence procedure might yield a tracker offset which places the hand back into intersecting contact with the object.

The convergence technique described for the embodiment above is time based. That is, once the impediment has been removed, the simulated hand will move toward the ghost hand at a rate that is functionally related to time. In an alternate embodiment, the simulated hand moves toward the ghost hand by a distance amount that is functionally related to the distance amount that the ghost hand moves. Thus, when the physical hand stops moving, the simulated hand will stop converging. Likewise, when the simulated hand is disparate from the ghost hand, any movement of the physical hand will result in some movement of the simulated hand—a desirable feature that is perceptually satisfying. In yet another embodiment, the convergence technique causes the simulated hand to converge with the ghost hand at a rate that is both a function of time and movement of the physical hand.

Modification for Force Feedback

The above algorithm can be modified to allow for realistic force feedback per finger. We assume that force feedback is accomplished by generating a tangent plane for each finger that is used in an impedance style control loop on a force controller. We also assume that the tracker offset calculation above being done on a host computer does not directly affect the forces in any way being calculated by the force controller.

We use the above tracker-offset algorithm to determine an array of offsets for each finger. These offsets are computed in exactly the manner discussed for the hand, using differential updates. That is:

Let i be the finger index, and let $J_i$ be the set of finger-geometry components of finger i with MTD <=0. Then for each i, and each k in {x,y,z}, we find j' such that $$j' = \underset{j' \text{ in } J_i}{\mathrm{argmax}} \| o_{Hn\_j(k)} \|$$

and set $$\Delta o_{H\_j(k)} = o_{Hn\_j'(k)}.$$

where i=1 . . . 5 is the finger index. The tangent plane offset value, determining the force for each finger, is calculated as $$o_{H\_i} = o_{H\_i} + \Delta o_{H\_i}.$$

The convergence of the finger offsets back to zero force may use the same convergence procedure at the hand offset convergence.

Before the force feedback tangent planes are sent to the feedback controller, the component of the finger offset in the normal direction to the tangent plane at the contact point is added to the plane offset so the controller sets the force as if the finger had actually penetrated the object by the offset $o_{H\_i}$.

Ghost-Hand Algorithm—Using Both Joint-Angle Offset and Tracker Offset

The algorithm discussed above results in a single vector that is used to adjust the tracker offset value for the whole hand. In this section, we discuss the extensions required to constrain fingers individually as well as the whole hand.

The joint-angle-offset algorithm discussed in this section consists of two components: (1) surface tracking and (2) an inverse-kinematic (IK) solver for each finger's joint angles.

Surface Tracking

The tracking algorithm discussed above works well for contact situations in which the contacting finger does not move significantly around inside the object during a collision. When the contacting finger moves, the tracked witness point $p'_A$ moves along the plane which is tangent to the surface at the initial contact point, $p_{B0}$. This plane corresponds to the surface of a polygonal geometry for a small range around the contact point. For larger ranges, or for curved geometries, the tangent plane may become invalid in the sense that $p'_A$ is no longer close enough to the surface of object B to be a valid assumption.

Figure 15:
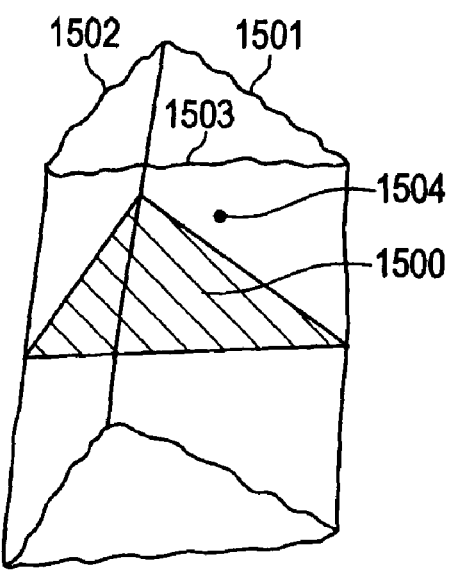
FIG. 15 is a diagrammatic view of a facet with surrounding voronoi planes.

For each facet of a polygonal geometry, it is possible to know the Voronoi regions that correspond to it. Using the Voronoi region yields a simple algorithm for checking if a point can be projected onto a finite planar polygonal patch, f (see FIG. 15). One way to check whether the point (1504) can be projected onto f (1500) is to find dot products onto all of the planes (1501, 1502 and 1503) perpendicular to the face that also contain an edge of the face.

Surface tracking for two objects A and B proceeds exactly as collision tracking described in the section above when the two objects are disjoint. Once a collision event occurs, the pre-contact tangent plane $t(p_{B0})$ is preserved exactly as before. However, now we also find the tangent planes for all the neighbors, $fj$, of the contact facet $f(p_{B0})$ on B, where neighbors include all facets, $fj$, that have a common edge or vertex with the contact facet, f. Note that each facet defines a tangent plane.

During a collision, in addition to the offset vector between the contact witness point and the contact facet, offsets for all the neighboring facets are also computed. If the witness point cannot be projected onto a facet, the offset for that facet is set to infinity. In the case where multiple objects are in contact, the offsets are the sorted to find the smallest, and this is the offset that is returned by the algorithm.

Inverse-Kinematics (IK) Solver

Figure 16:
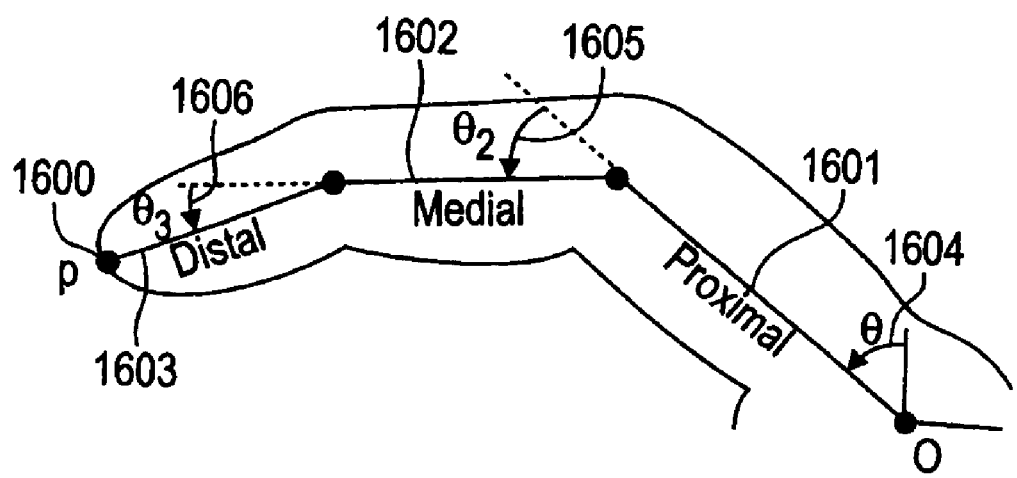
FIG. 16 is a diagrammatic side view of a finger, with links and joint angles defined.

In this section we extend the tracker ghost-hand algorithm to cover a finger-based contact situation. If we apply the surface tracking algorithm discussed above to each finger geometry, we get a single offset vector that would place the finger on the object surface. However, each finger is a kinematically constrained linkage whose degrees of freedom are rotational joints (see FIG. 16).

The fingertip position (1600) can be given in the abduction plane (i.e., the plane defined by at least two of the three phalanges) by the following two forward-kinematic equations:

$$p_x = d_p * \cos(\theta_1) + d_m * \cos(\theta_1 + \theta_2) + d_d * \cos(\theta_1 + \theta_2 + \theta_3)$$

$$p_y = d_p * \sin(\theta_1) + d_m * \sin(\theta_1 + \theta_2) + d_d * \sin(\theta_1 + \theta_2 + \theta_3)$$

where $d_p$, $d_m$ and $d_d$ are the lengths of the proximal (1601), medial (1602) and distal (1603) phalanges, respectively. The angles $\theta_1$ (1604), $\theta_2$ (1605) and $\theta_3$ (1606) are measured joint angles.

Figure 17:
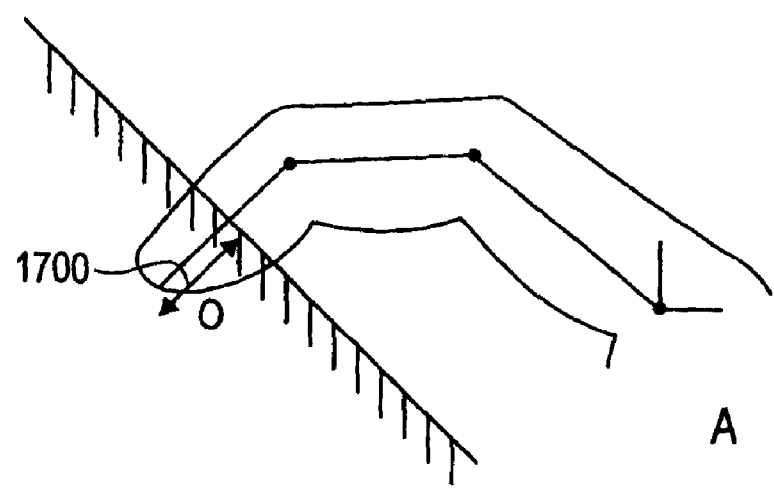
FIGS. 17A and 17B are diagrammatic side views of a finger: (A) before calculating joint adjustments to back the finger out from the wall, and (B) after performing such calculations.
Figure 17:
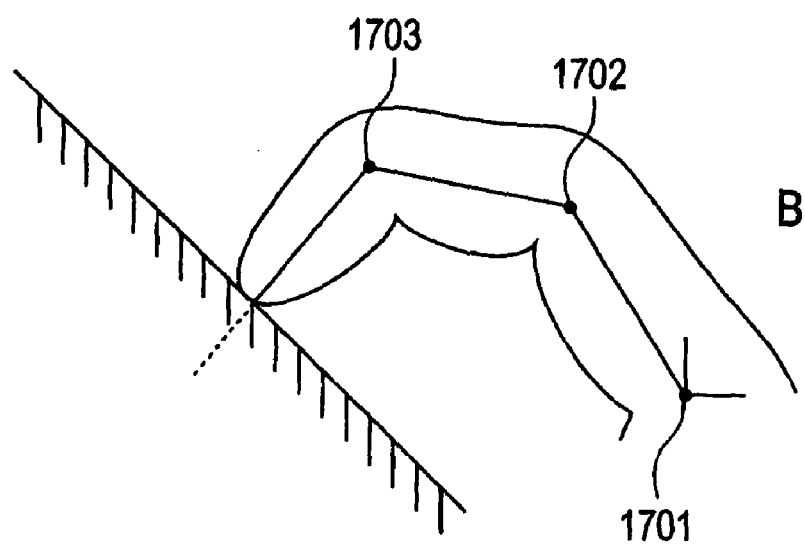

The surface tracking algorithm gives us a desired change in position (i.e., offset, o) (1700) for each fingertip (see FIGS. 17A and 17B). To convert this into corresponding change in joint angles, we compute the Jacobian, J, of the above equation. To determine the individual joint angle offsets from the desired change in fingertip position, p, we solve the following equation for $\Theta$, $$J\Theta = o,$$

where $\Theta$ is the vector $(\Delta\theta_1, \Delta\theta_2, \Delta\theta_3,)^T$ of angle modifications for the three angles (1701, 1702 and 1703) and o (1700) is the desired surface offset vector. To bias the various joint angles in the solution, much in the same way that we would by using different spring stiffnesses in the spring model, we may set $\Theta = (w_1 * \Delta\theta_1, w_2 * \Delta\theta_2, w_3 * \Delta\theta_3)^T$, where $w_1$, $w_2$ and $w_3$ are weighting (biasing) matrices. The matrix J is singular, and to invert we may use the Moore-Penrose pseudo inverse. Another possible solution technique is the minimum-energy least-squares approach (which might have some stability problems). The inverse may also be calculated using singular-value decomposition (SVD).

Once new joint-angle offsets have been computed, they are added to the current joint angle values. If the new joint angle value is outside of the joint limits, i.e., the range of allowable joint-angle values, it is simply clamped there. Once this is done for all three joints, it is possible that (due to joint limits), the finger is still penetrating the object.

After all fingers have been constrained in this way, there will in general be 5 offset vectors that indicate how far the IK solver was from solving the offset problem. These offsets are used as inputs to the tracker offset algorithm discussed in the previous section. Once the tracker is offset, a new "desired offset" vector for each finger may be calculated, and a new $\Theta$ vector may correspondingly be determined for each finger.

Even in the case where all 5 fingers can be offset within their joint limits, it may be desirable to distribute some of the desired finger offset toward repositioning the entire hand. One way to accomplish this is by adding all finger x-axis offsets to yield an overall x-axis offset for the hand. Y-axis and z-axis offsets for the hand are determined similarly. Weighting factors, $w_x$, $w_y$, and $w_z$, typically <1, may also be used to choose an overall hand offset which is proportional to the summed offsets.

Figure 18:
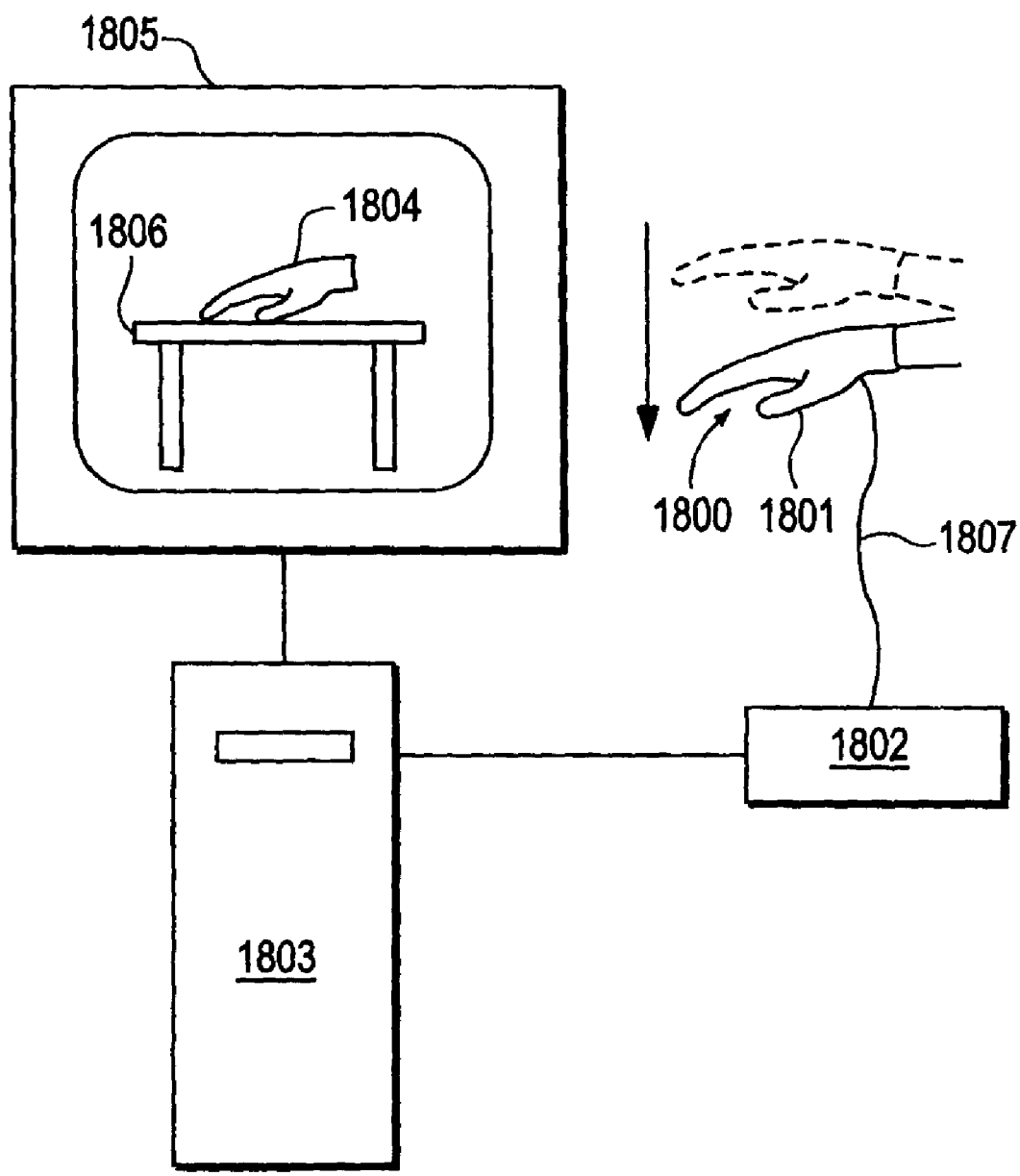
FIG. 18 is a diagrammatic side view of a physical hand and instrumented glove continuing to move after a graphical hand, being controlled by the glove, is caused to stop at a simulated table by the inventive constraining method.

FIG. 18 shows an embodiment where a physical hand (1800) is wearing an instrumented glove (1801), such as a Virtual Technologies, Inc. CyberGlove. The glove is connected via a wire or wireless link (1807) to an instrumentation unit (1802) which provides digitized values to the computer system (1803), which comprises at least a CPU and memory. The computer displays a graphical image (1804) of the measured physical hand on the computer monitor (1805). As the physical hand moves downward, the graphical hand collides with the simulated graphical table (1806) on the screen. Using the inventive step provided by the subject invention, the computer calculates the modifications for the hand-measurement data necessary to prevent the simulated hand from penetrating the simulated table.

The inventive structure and method provides an unprecedented level for computer-simulated virtual hand interaction with graphical objects. The hand-constraint technology provides significant commercial potential wherever humans use their hands to interact with digital objects. A generic hand-based simulator is the panacea of virtual reality and has unfathomable commercial potential, limited only by the imagination. Some of the commercial products and services being contemplated and some corresponding market niches include:

1. 3D computer operating systems
2. Computer games
3. Training of factory employees in assembly line operation.
4. Simulation of aircraft cockpits and airport control towers.
5. Virtual prototyping of car interiors and ergonomic analysis of proposed designs.
6. Design and usability testing of a multitude of control panels.
7. Training and performance testing of NASA, Navy, Air Force, Army and other personnel.
8. Rapid prototyping.

All publications, patents, and patent applications mentioned in this specification are herein incorporated by reference to the same extent as if each individual publication or patent application was specifically and individually indicated to be incorporated by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

What is claimed is:

1. A method comprising:
   determining a set of object haptic boundaries in a virtual haptic space, the set of object haptic boundaries different from a set of object graphical boundaries in a virtual graphical space, the object haptic boundaries and the object graphical boundaries associated with a virtual object;
   determining a set of device haptic boundaries in the virtual haptic space, the set of device haptic boundaries different from a set of device graphical boundaries in the virtual graphical space, the device haptic boundaries and the device graphical boundaries associated with a physical device;
   receiving control inputs from the physical device;
   using the control inputs to cause changes to the set of device haptic boundaries within the virtual haptic space and the set of device graphical boundaries within the virtual graphical space;
   comparing the set of object haptic boundaries with the set of device haptic boundaries within the virtual haptic space to identify an overlap between the set of object haptic boundaries and the set of device haptic boundaries; and
   constraining changes to the set of device graphical boundaries within the virtual graphical space when an overlap is identified; and
   identifying a depth of penetration by determining an amount of overlap of the set of object haptic boundaries with the set of device haptic boundaries.

2. The method of claim 1, further comprising:
   using the set of object graphical boundaries to modify the set of device graphical boundaries.

3. The method of claim 1, wherein the physical device is a multi-articulate structure and further comprising:
   modeling the multi-articulate structure using a revolute-joint-link-spring model.

4. The method of claim 1, further comprising:
   transmitting a force feedback signal to the physical device when the overlap is identified.

5. The method of claim 1, wherein the constrained movement is a flex manifested in a displacement of the set of graphical boundaries relative to an unflexed position thereof.

6. A system comprising:
   memory configured to store data for a virtual space; and
   a processor configured to:
      determine a set of object haptic boundaries in a virtual haptic space, the set of object haptic boundaries different from a set of object graphical boundaries in a virtual graphical space, the object haptic boundaries and the object graphical boundaries associated with a virtual object;
      determine a set of device haptic boundaries in the virtual haptic space, the set of device haptic boundaries different from a set of device graphical boundaries in the virtual graphical space, the device haptic boundaries and the device graphical boundaries associated with a physical device;
      receive control inputs from the physical device,
      use the control inputs to cause changes to the set of device haptic boundaries within the virtual haptic space and the set of device graphical boundaries within the virtual graphical space,
      compare the set of object haptic boundaries with the set of device haptic boundaries within the virtual haptic space to identify an overlap between the set of object haptic boundaries and the set of device haptic boundaries, and
      constrain changes to the set of device graphical boundaries within the virtual graphical space when an overlap is identified; wherein the processor is further configured to determine a depth of penetration based on an amount of overlap of the set of object haptic boundaries with the set of device haptic boundaries.

7. The system of claim 6, wherein the physical device is a multi-articulated device.

8. The system of claim 7, wherein the processor is configured to model the multiarticulated device as a revolute-joint-link spring model.

9. The system of claim 8, wherein the processor is configured to constrain changes of the set of device graphical boundaries by computing modified joint and link positions of the virtual device.

10. The system of claim 6, wherein the processor is further configured to transmit a force feedback signal to the physical device when the overlap is identified.

11. The system of claim 6 wherein the control inputs include measurements of flexure, translation and rotation of the device.

12. The system of claim 6 wherein the constrained change is a flex manifested in a displacement of the set of device graphical boundaries relative to an unflexed position thereof.

13. A computer readable storage medium containing executable instructions which cause a data processing system to perform a method comprising:
   determining a set of object haptic boundaries in a virtual haptic space, the set of object haptic boundaries different from a set of object graphical boundaries in a virtual graphical space, the object haptic boundaries and the object graphical boundaries associated with a virtual object;
   determining a set of device haptic boundaries in the virtual haptic space, the set of device haptic boundaries different from a set of device graphical boundaries in the virtual graphical space, the device haptic boundaries and the device graphical boundaries associated with a physical device;
   receiving control inputs from the physical device;
   using the control inputs to cause changes to the set of device haptic boundaries within the virtual haptic space and the set device graphical within the virtual graphical space;
   comparing the set of object haptic boundaries with the set of device haptic boundaries within the virtual haptic space to identify an overlap between the set of object haptic boundaries and the set of device haptic boundaries; and
   constraining changes to the set of device graphical boundaries within the virtual graphical space when an overlap is identified; and
   identifying a depth of penetration by determining an amount of overlap of the set of object haptic boundaries with the set of device haptic boundaries.

14. The computer readable storage medium of claim 13, further comprising:
   using the set of object haptic boundaries to modify the set of device graphical boundaries.

15. The computer readable storage medium of claim 13, wherein the physical device is a multi-articulate structure and further comprising:

modeling the multi-articulate structure using a revolute-joint-link-spring model.

16. The computer readable storage medium of claim 13, further comprising:

transmitting a force feedback signal to the physical device when the overlap is identified.

17. The computer readable storage medium of claim 13, wherein the constrained change is a flex manifested in a displacement of the set of device graphical boundaries relative to an unflexed position thereof.

\* \* \* \* \*